Feb. 12, 1946.  F. D. PALMER  2,394,935
METHOD AND APPARATUS FOR FORMING LINED BOXES
Filed Aug. 11, 1941   18 Sheets-Sheet 1

Inventor
Frank D. Palmer
By: Soans, Pond & Anderson Attys.

Feb. 12, 1946.  F. D. PALMER  2,394,935
METHOD AND APPARATUS FOR FORMING LINED BOXES
Filed Aug. 11, 1941  18 Sheets-Sheet 2

Inventor
Frank D. Palmer
By Soans, Pond & Anderson Attys.

Feb. 12, 1946. F. D. PALMER 2,394,935
METHOD AND APPARATUS FOR FORMING LINED BOXES
Filed Aug. 11, 1941 18 Sheets-Sheet 3

Inventor
Frank D. Palmer
By Evans, Pond & Anderson Attys.

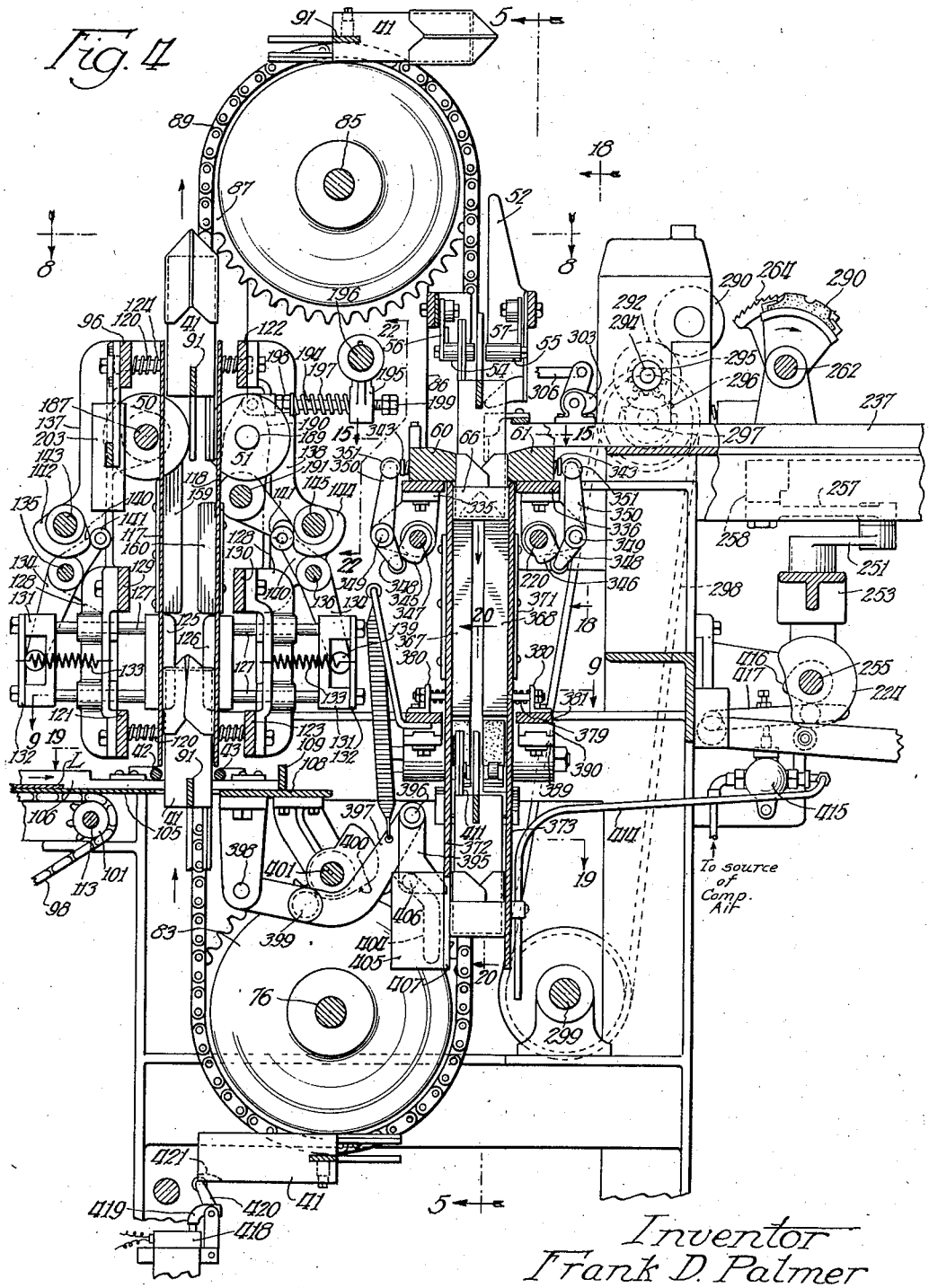

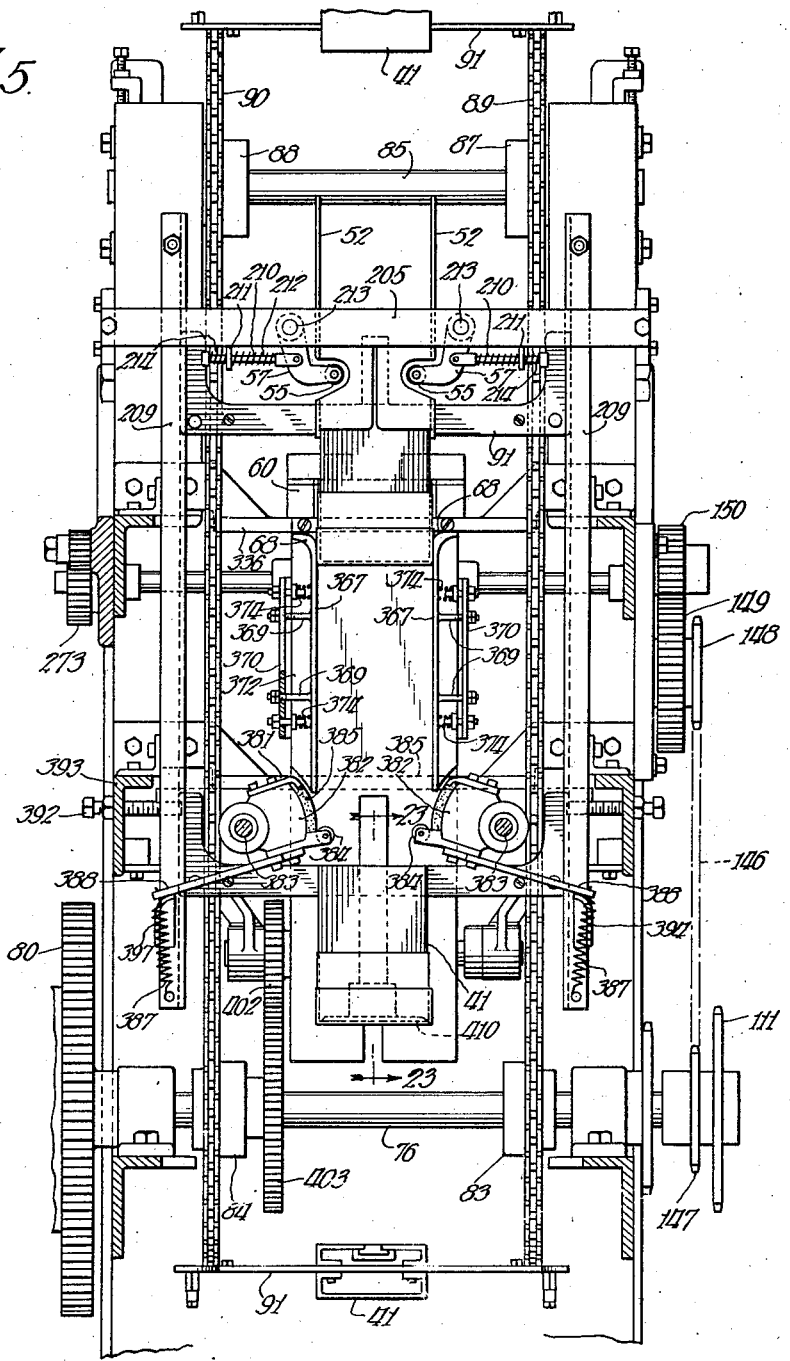

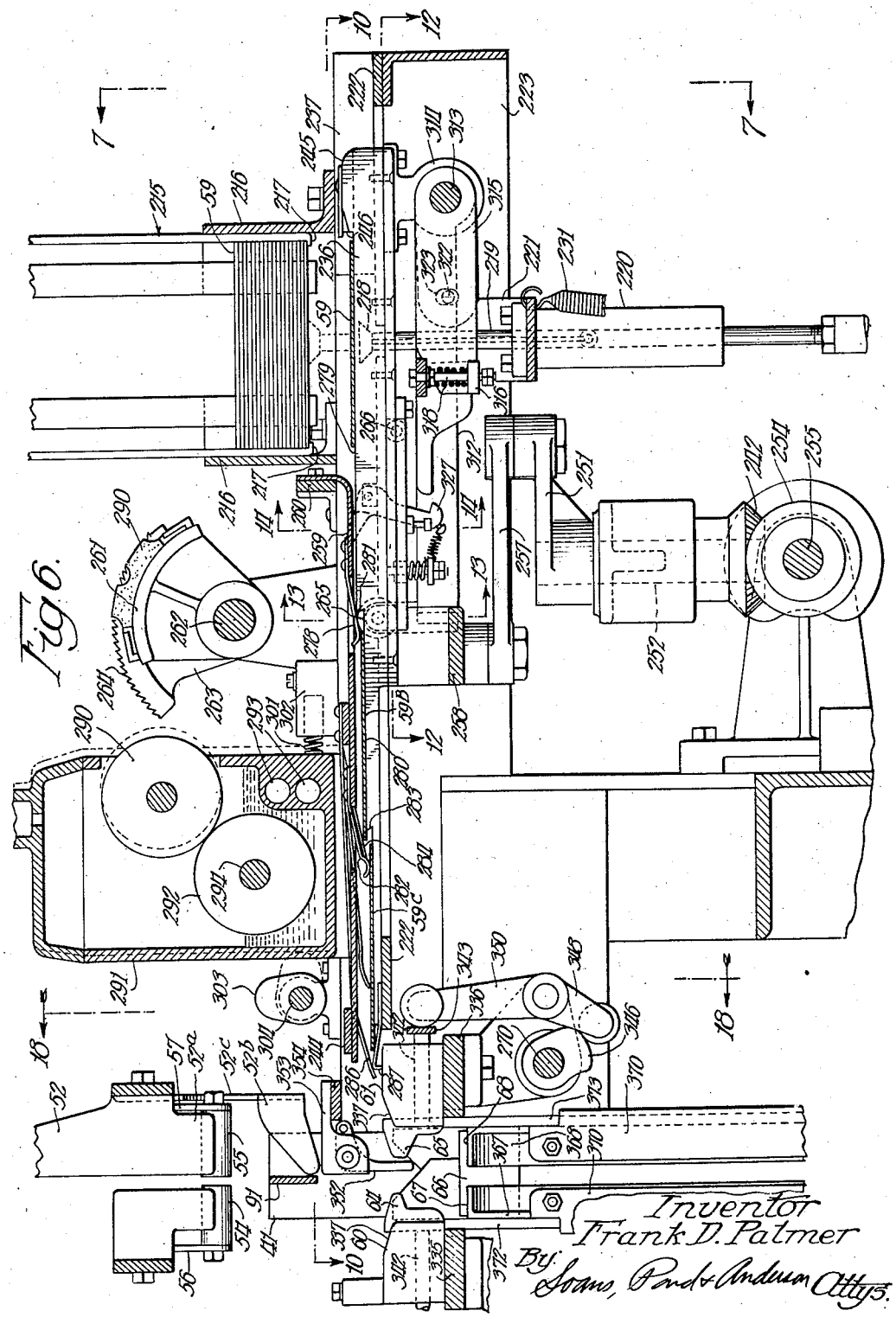

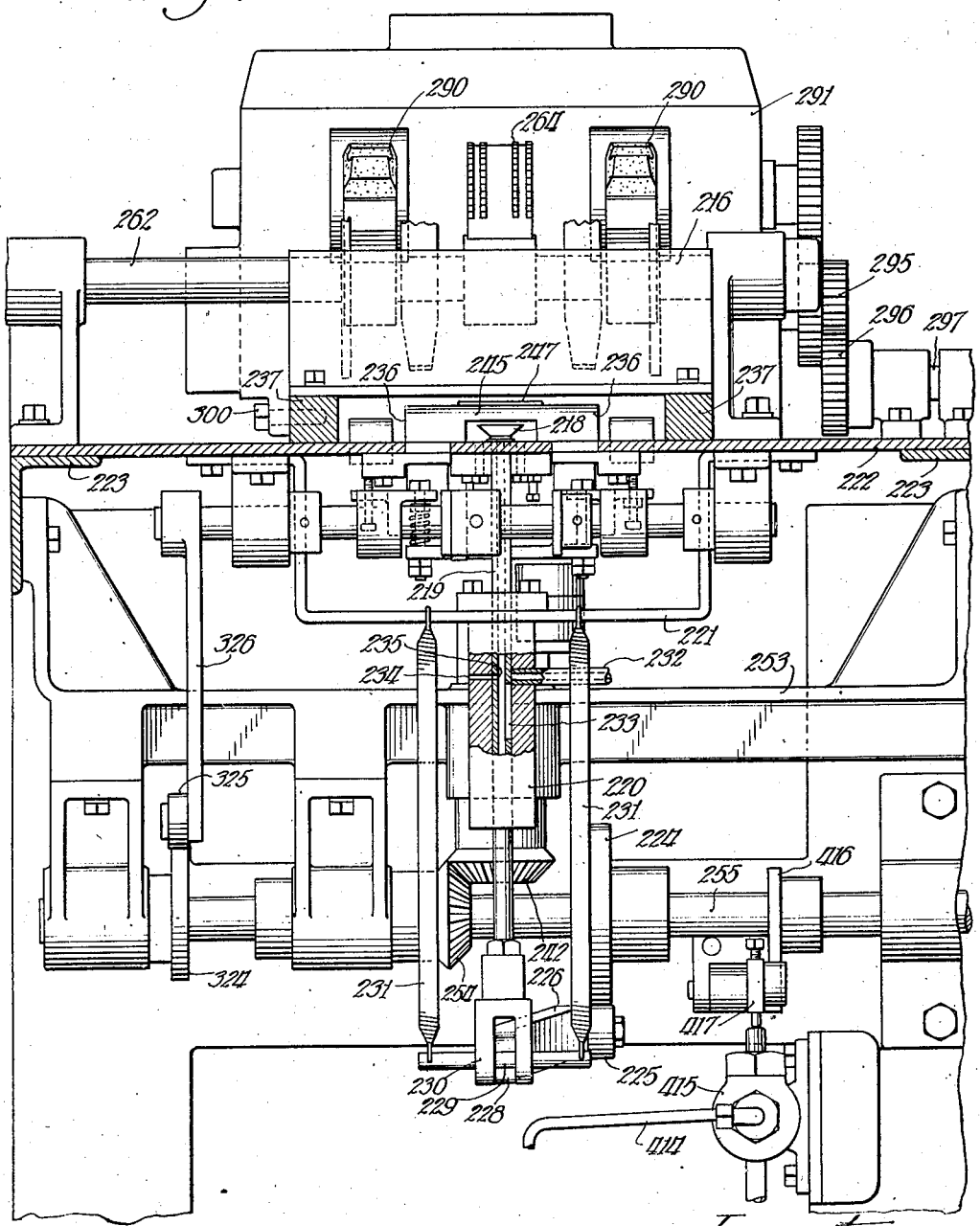

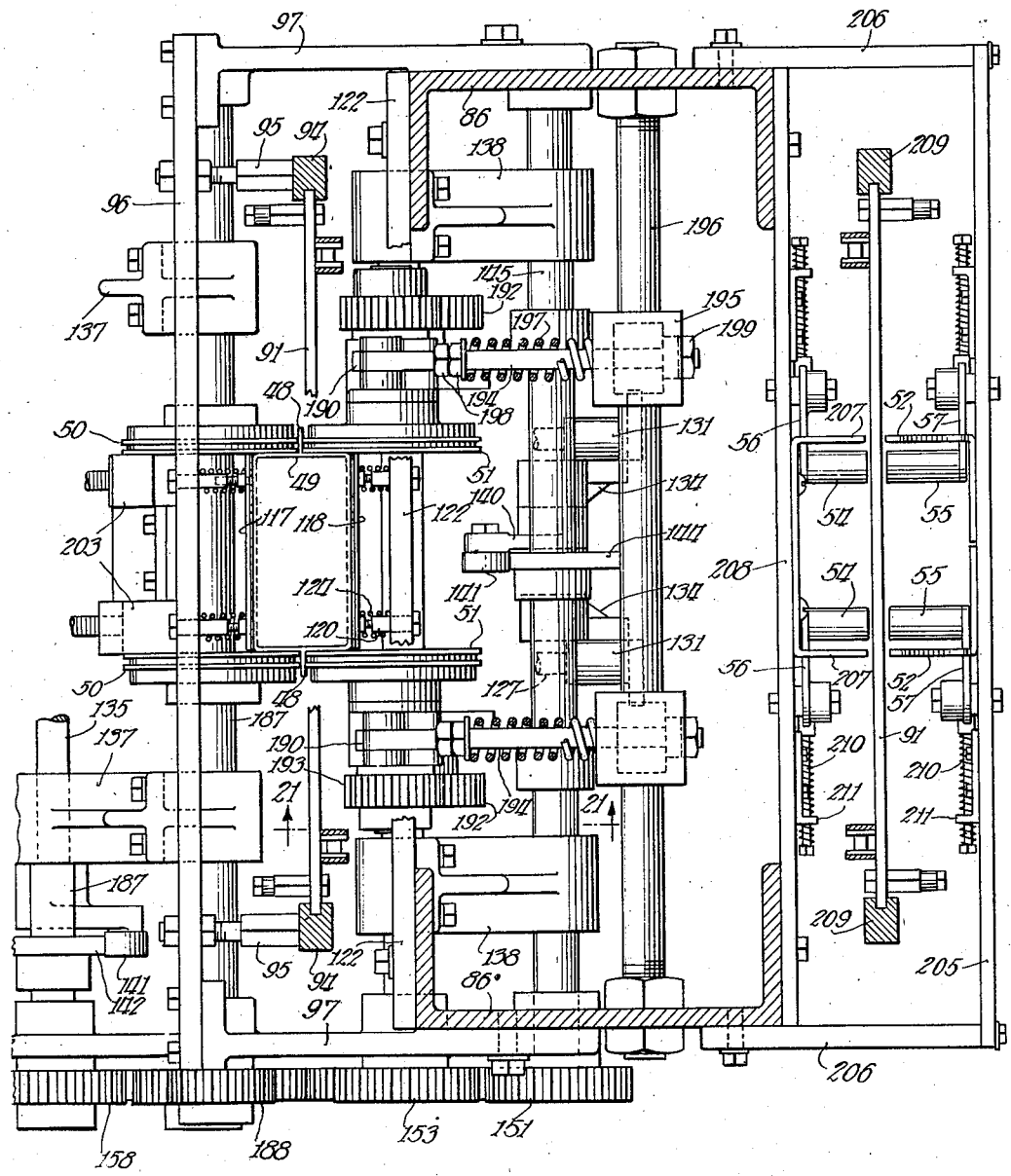

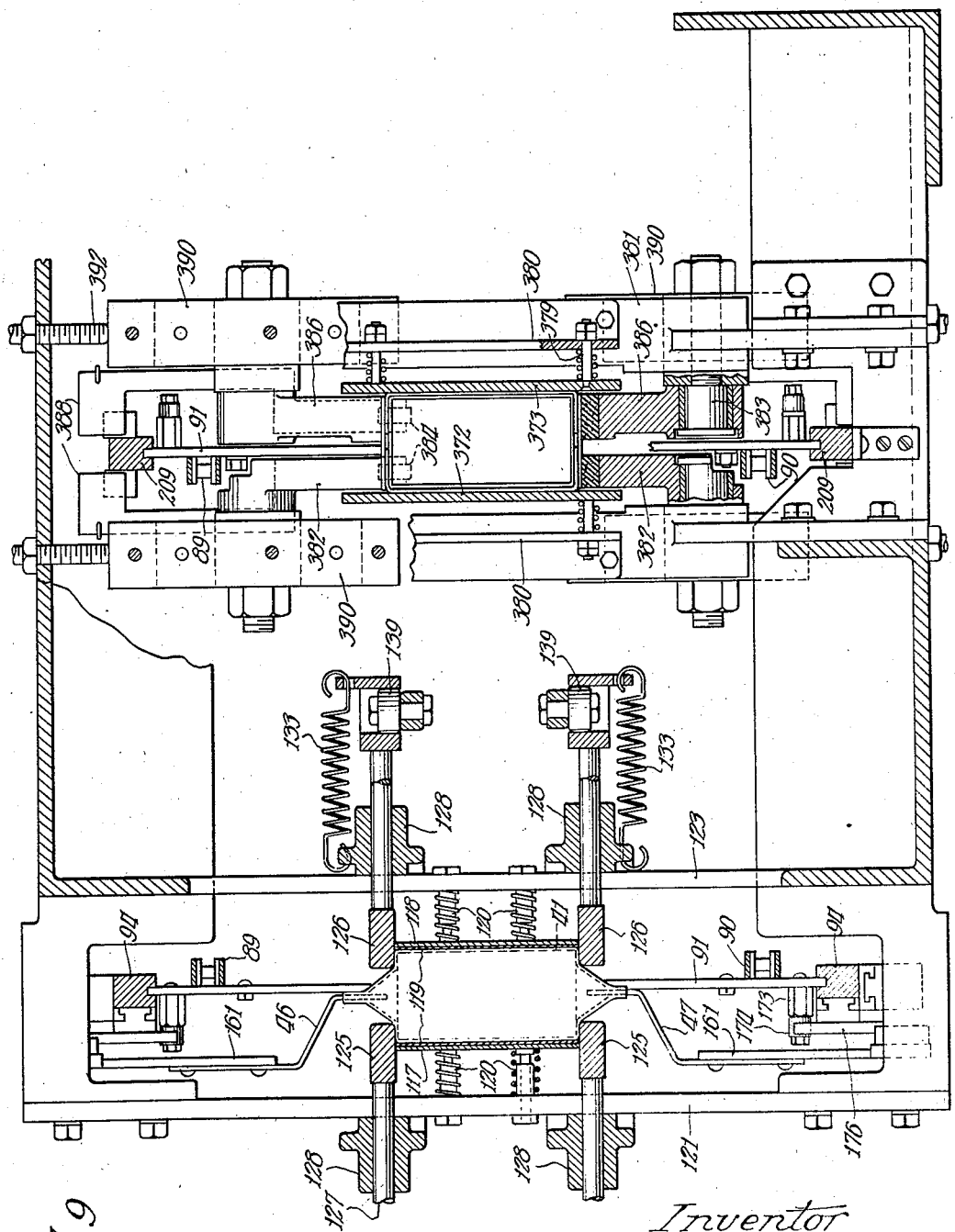

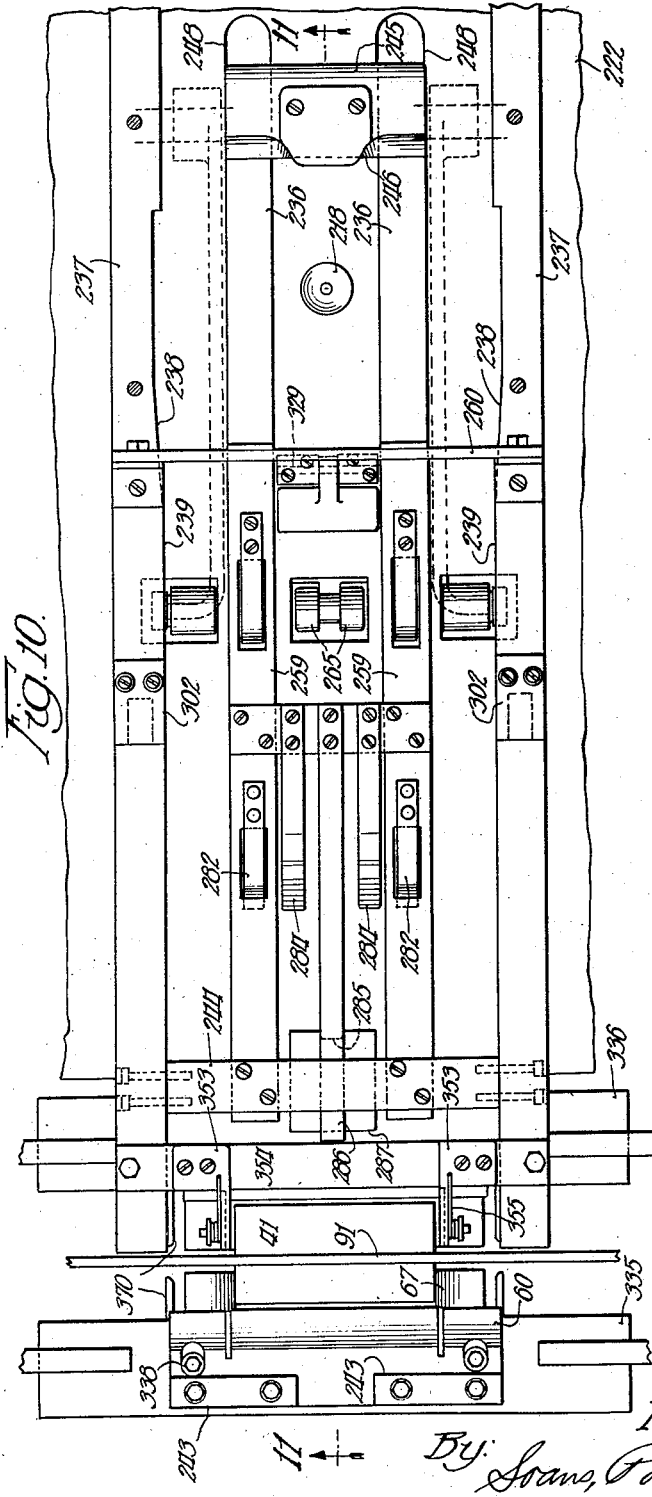
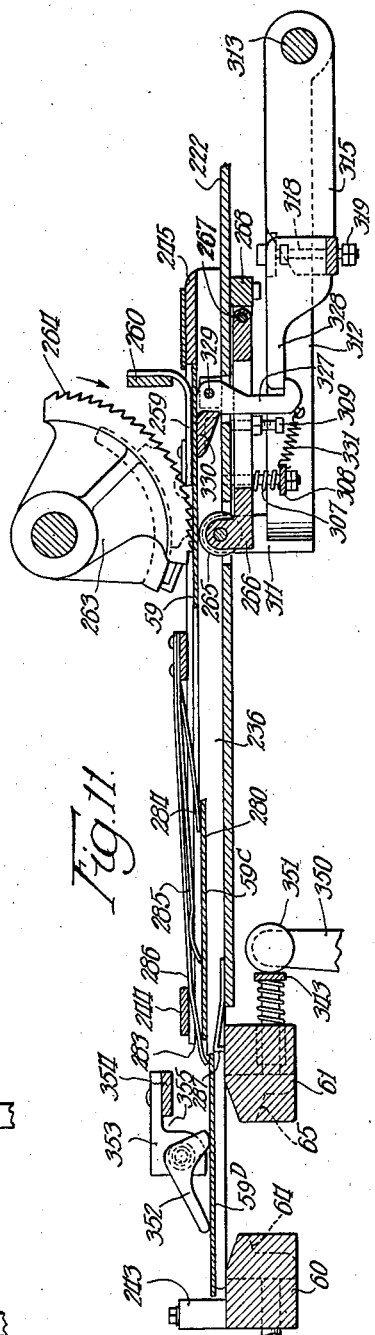

Feb. 12, 1946.　　　F. D. PALMER　　　2,394,935
METHOD AND APPARATUS FOR FORMING LINED BOXES
Filed Aug. 11, 1941　　18 Sheets-Sheet 11
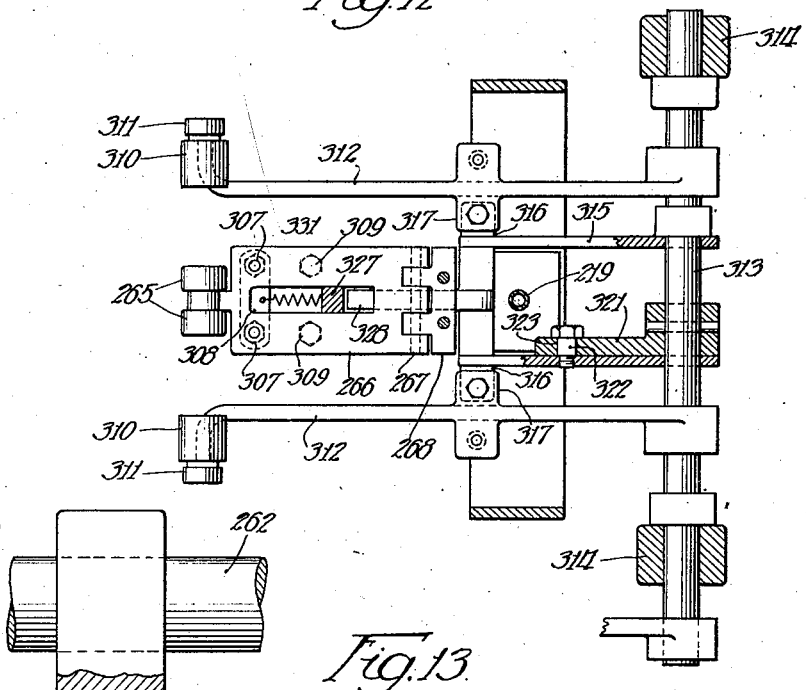
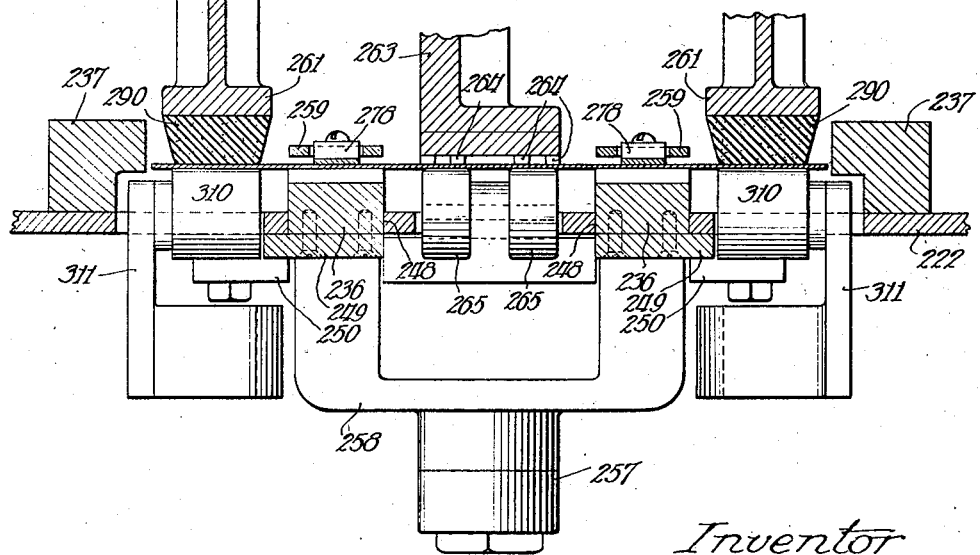
Inventor
Frank D. Palmer
By Soans, Pond & Anderson Attys.

Feb. 12, 1946. F. D. PALMER 2,394,935
METHOD AND APPARATUS FOR FORMING LINED BOXES
Filed Aug. 11, 1941 18 Sheets-Sheet 12
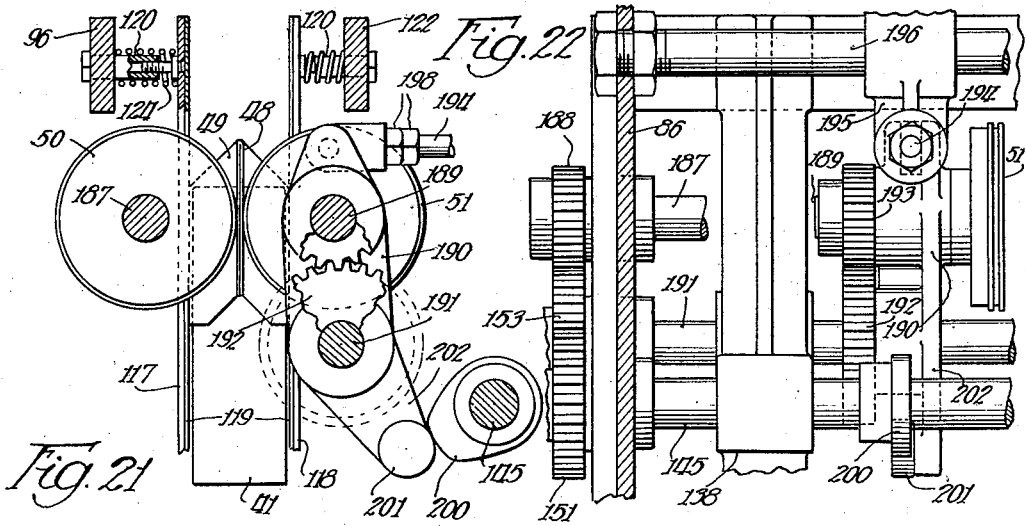
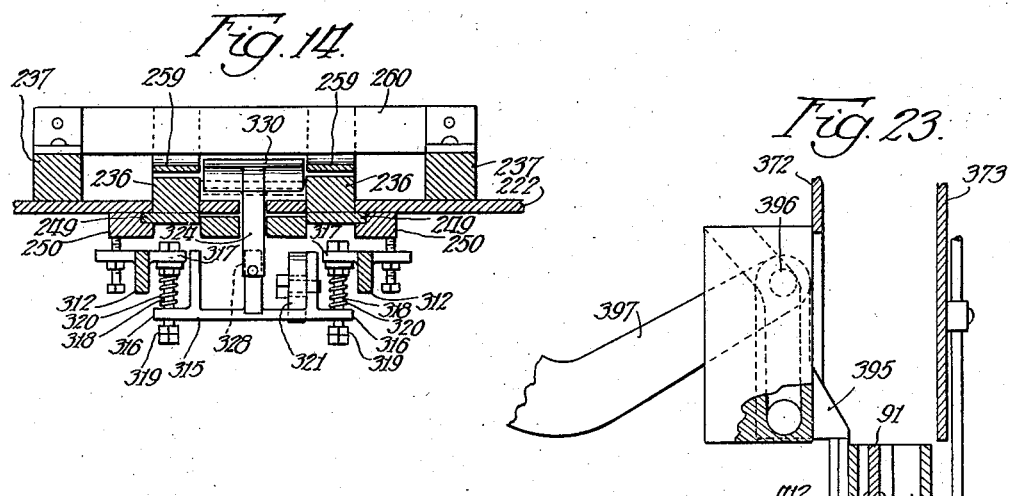
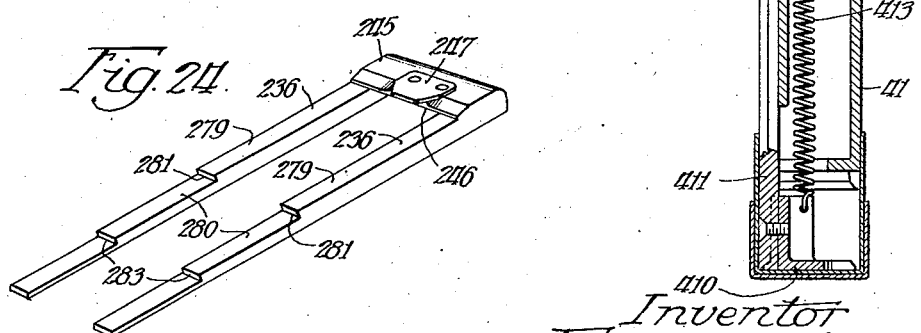
Inventor
Frank D. Palmer
By Soans, Pond & Anderson Attys

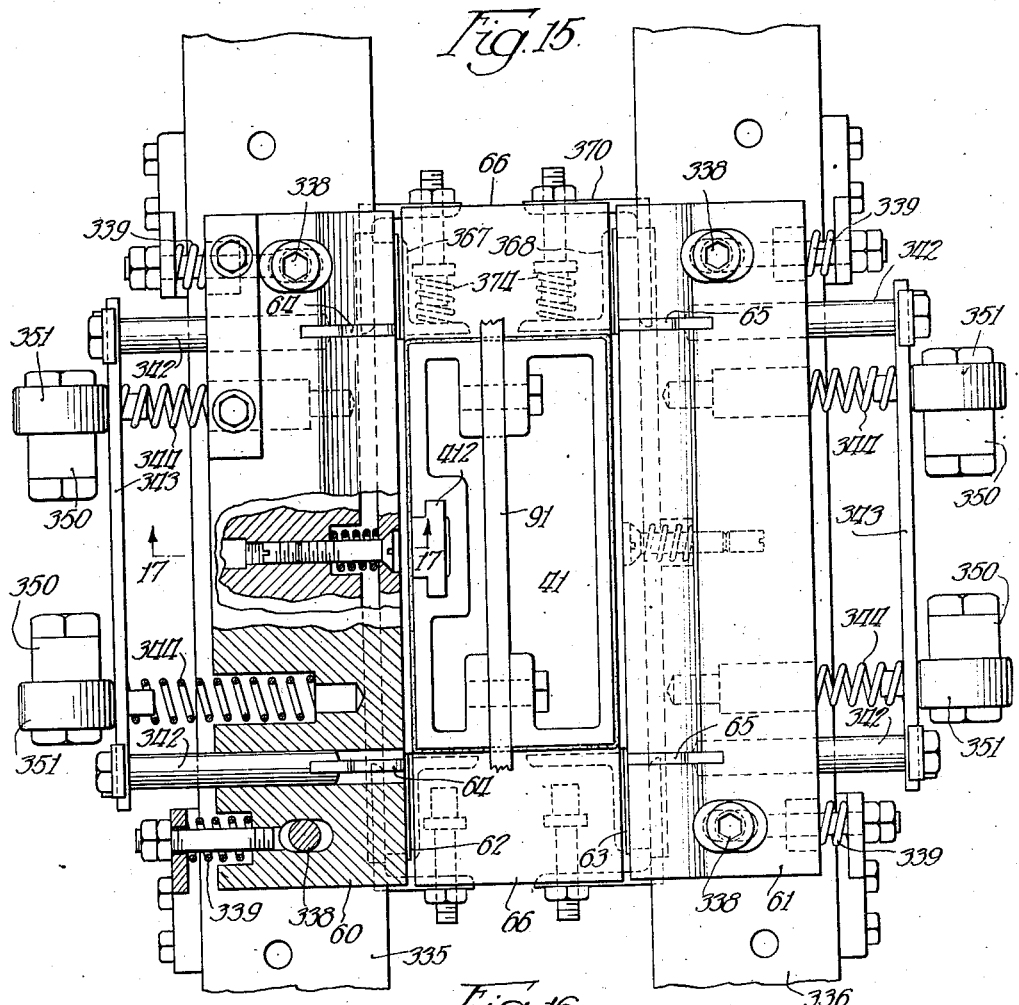

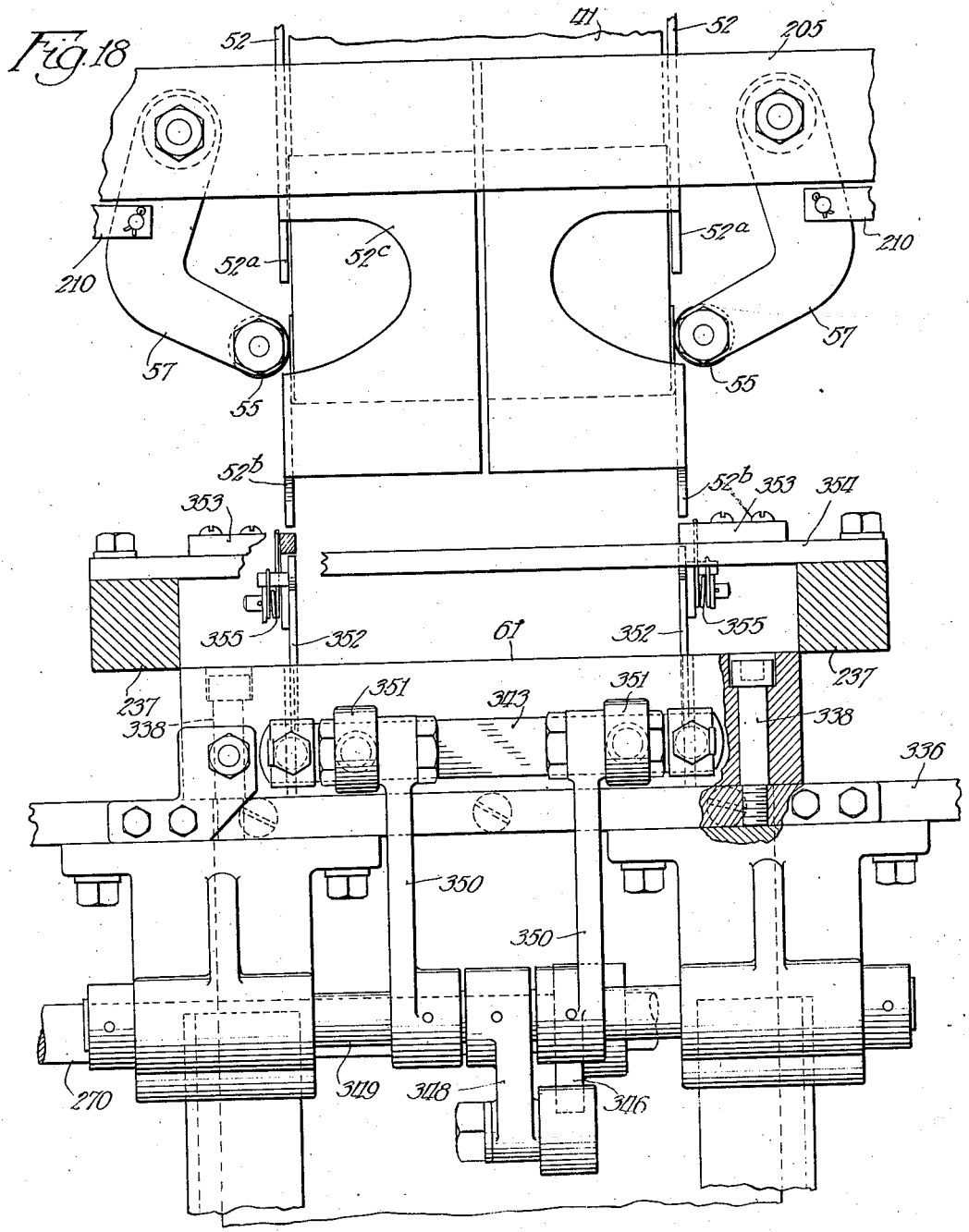

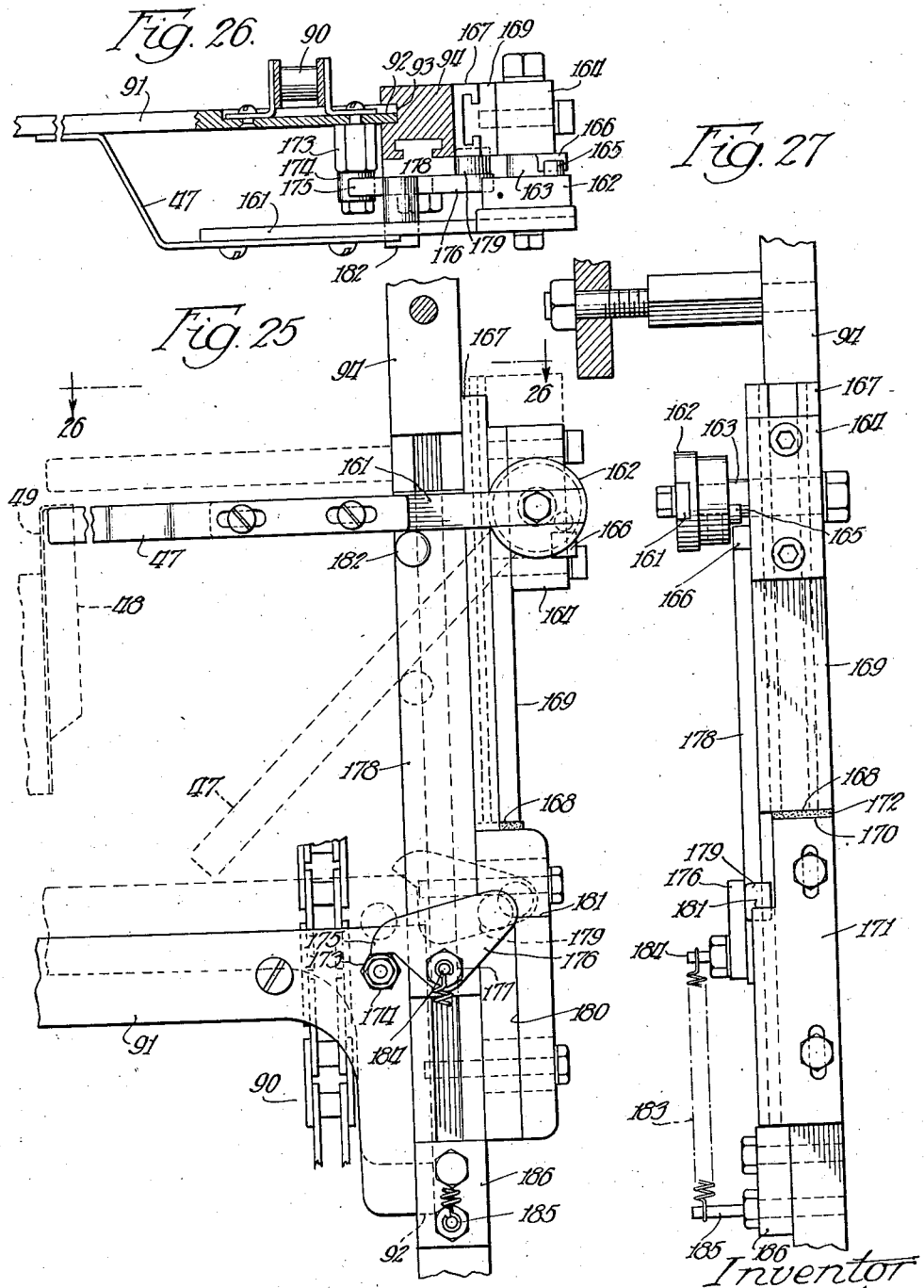

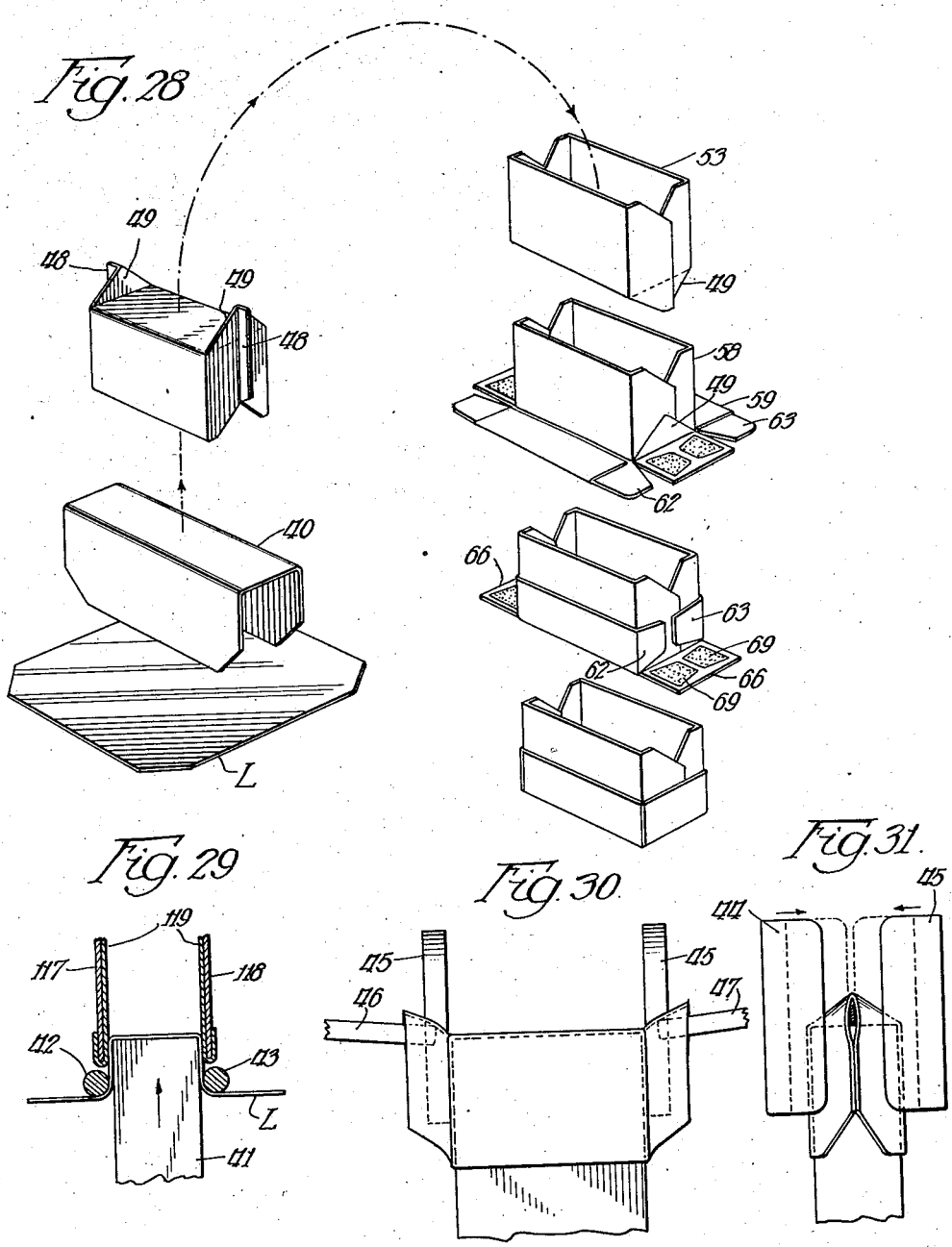

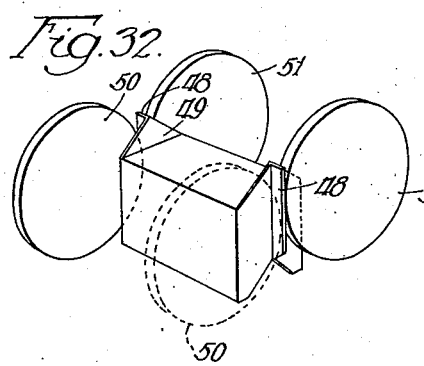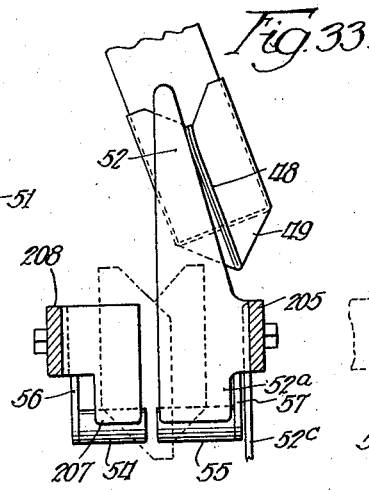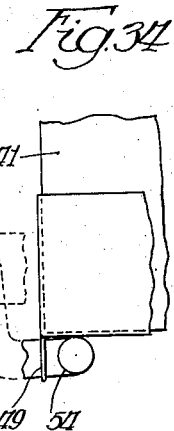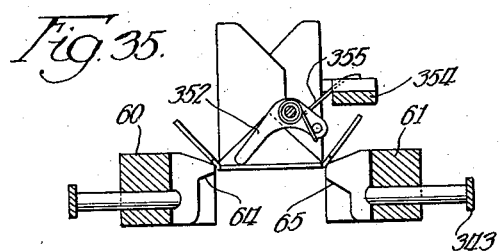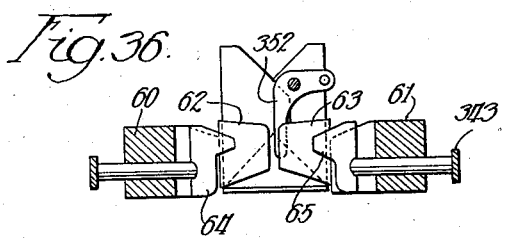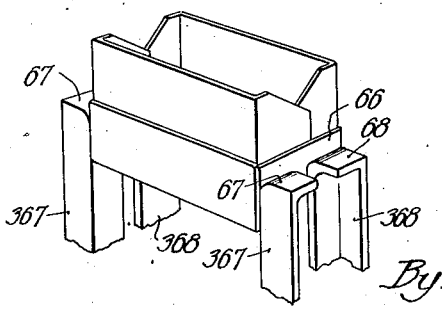

Patented Feb. 12, 1946

2,394,935

UNITED STATES PATENT OFFICE 2,394,935

METHOD AND APPARATUS FOR FORMING LINED BOXES

Frank D. Palmer, Chicago, Ill., assignor to Kraft Foods Company, a corporation of Delaware Application August 11, 1941, Serial No. 406,322

27 Claims. (Cl. 93—36.01)

This invention relates to an improved method and apparatus for forming lined boxes and it is concerned more particularly with the setting up of paper board boxes from preformed blanks, together with the provision of a lining in such box.

The main objects of the invention are to provide an improved method and apparatus for the purpose indicated in which the lining element for the box is completely fabricated into a moisture-tight receptacle especially in respect of joints therein; to provide an arrangement in which a lining element is formed and automatically associated with a protective or outer paper board carton or box; to provide a method and apparatus of the character indicated which will be rapid and efficient in operation, essentially automatic and of relatively quiet, continuously operating character; and in general it is the object of the invention to provide an improved method and apparatus for forming lined boxes or cartons suitable for packaging of a wide variety of materials.

Other objects and advantages of the invention will be understood by reference to the following specification and accompanying drawings (18 sheets) wherein there is disclosed a method and apparatus for making lined boxes according to a selected form of the invention.

In the drawings:

Fig. 4 is a section on the line 4—4 of Fig. 3;

Fig. 5 is a section on the line 5—5 of Fig. 4;

Fig. 6 is a section on a vertical plane near the central vertical plane of the right-hand portion of the apparatus as shown in Fig. 1;

Fig. 7 is a section on the line 7—7 of Fig. 6;

Figure 3:
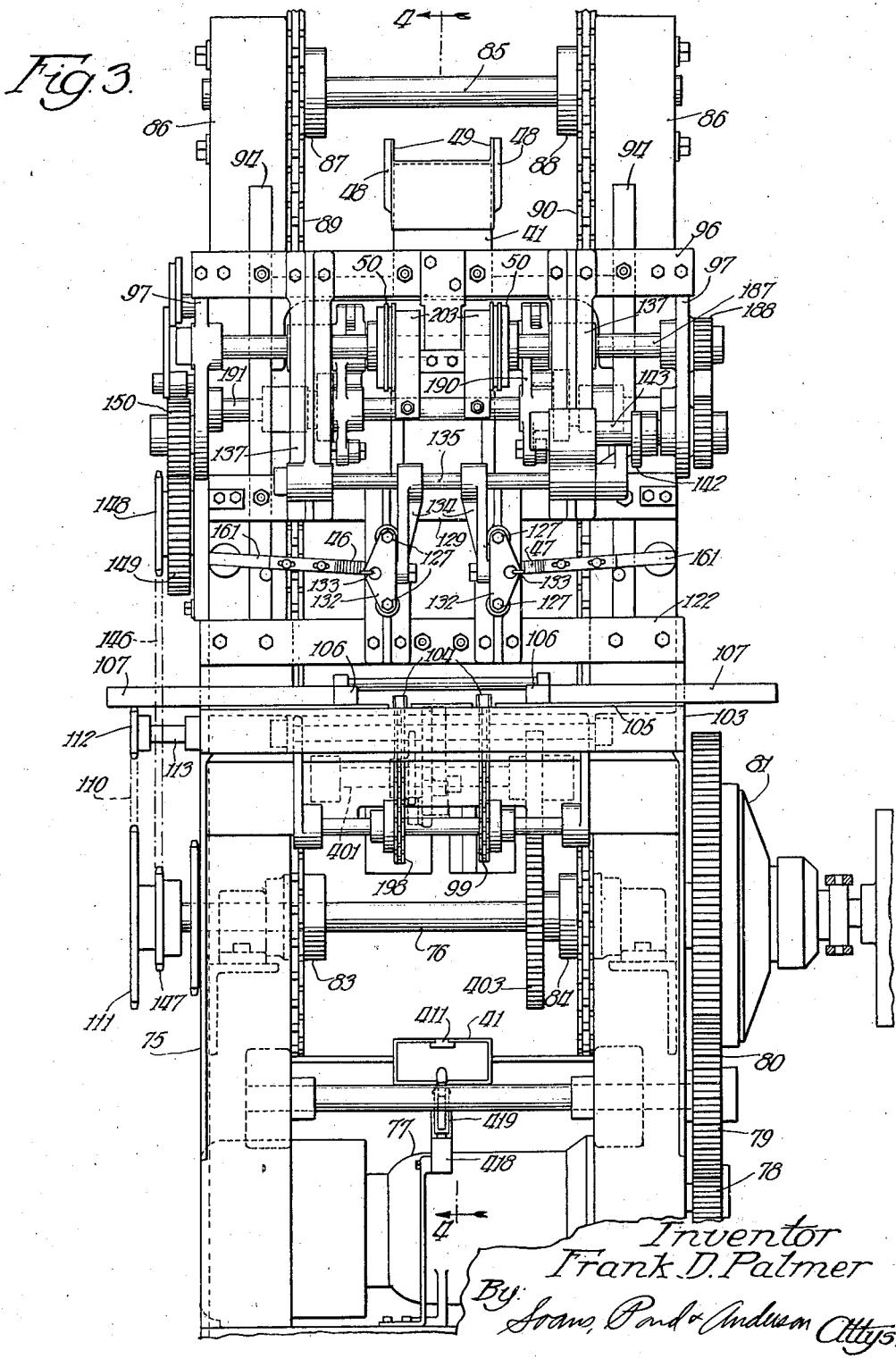
Fig. 3 is an elevation of one end of the apparatus, i. e., the left-hand end thereof as shown in Fig. 1.
Figure 19:
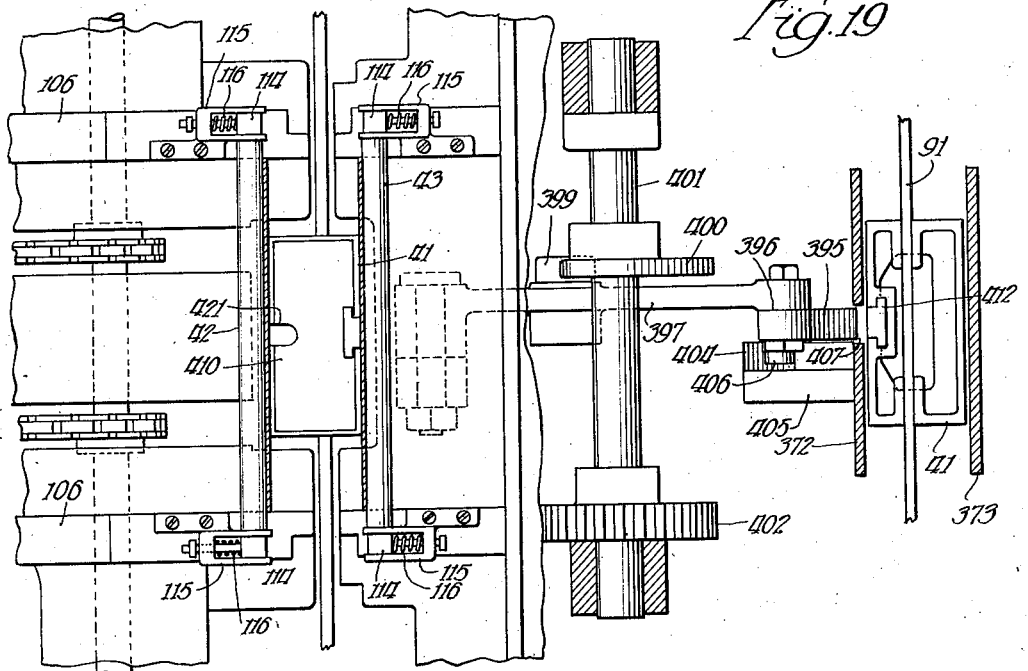
Figure 20:
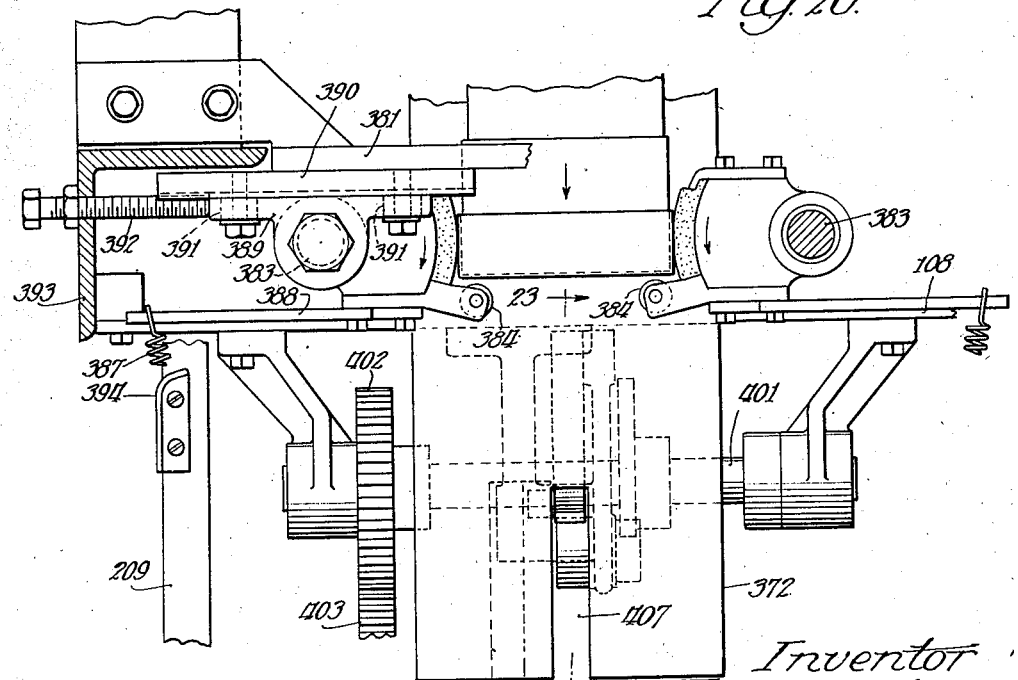

Figs. 8 and 9 are sections, respectively, on the lines 8—8 and 9—9 of Fig. 4;

Fig. 10 is a section on the line 10—10 of Fig. 6;

Fig. 11 is a section on the line 11—11 of Fig. 10;

Figs. 12, 13 and 14 are sections, respectively, on the lines 12—12, 13—13 and 14—14 of Fig. 6;

Fig. 15 is a fragmentary plan approximately on the line 15—15 of Fig. 4;

Fig. 16 is a fragmentary view corresponding to a portion of Fig. 15 but showing a changed position of certain parts;

Fig. 17 is a section on the line 17—17 of Fig. 15;

Fig. 18 is a section on the line 18—18 of Figs. 4 and 6;

Figs. 19 and 20 are sections, respectively, on the lines 19—19 and 20—20 of Fig. 4;

Fig. 21 is a section on the line 21—21 of Fig. 8;

Fig. 22 is a fragmentary elevation of portions indicated by the line 22—22 of Fig. 4;

Fig. 23 is an enlarged illustration, partly in section corresponding to certain portions of Fig. 4;

Fig. 24 is a perspective of an element of mechanism appearing also more or less prominently in Figs. 6, 10, 11 and 13;

Fig. 25 is a fragmentary elevation on an enlarged scale of certain portions appearing also more or less prominently in Figs. 3 and 9;

Fig. 26 is a section on the line 26—26 of Fig. 25;

Fig. 27 is a side elevation of the structure illustrated in Fig. 25;

Fig. 28 is a more or less diagrammatic illustration in perspective of the steps performed in forming a lined box by the apparatus shown in Figs. 1 to 27, inclusive; and Figs. 29 to 37, inclusive, are more or less diagrammatic illustrations of the principal elements of the apparatus and their respective functions in the formation of a lined box.

*General outline of the improved lined box forming method and apparatus*

The apparatus herein disclosed operates initially on a pre-cut blank of lining material such as illustrated at L in Figure 28. The first action on the lining material blank is to fold it into the inverted U-shaped form illustrated at 40, this operation being performed by means of a mandrel such as indicated at 41 (Figure 29) which passes upwardly between a pair of rolls 42 and 43, so that the liner blank is folded to U-shape around the forward end of the upwardly moving mandrel.

During the continued progress of the mandrel 41 in an upward direction, tucking devices indicated at 44 and 45 (Figure 31) operate to fold end portions of the folded liner inwardly toward each other and over the opposite side walls of the mandrel. A pair of arms 46 and 47 also act on the projecting end portions of the liner in cooperation with the inward folding action of the members 44 and 45 to control the folding effect of the members 44 and 45 thereby to cause the marginal end portions of the liner to be brought into face to face, laterally extending relation as indicated at 48 in Figure 28. Incident to the inward folding of the end portions of the liner, triangular shaped ears 49 are formed, the same extending laterally from the ends of the liner portion which overlies the upper end of the mandrel.

The laterally projecting marginal portions 48 are next united to each other by the application of pressure thereto. The liner blank may be made of any desired material suitable for the particular purpose of the carton to be produced and a suitable coating of adhesive material is applied to the proper portions of the blank for facilitating the production of a secure and moistureproof joint between the interengaging faces of the marginal end portions 48. In one instance, which may serve as illustrative of the present embodiment of the invention, the blank L is a relatively thin, flexible sheet, such as "Cellophane" or other box lining material and it is provided with a coating of a thermo-plastic adhesive material over one entire face. The coating may, for example, be one of a so-called rubber-wax composition which of itself imparts moisture-proofness to the lining sheet and which material is of a thermo-plastic character capable of being fused by the application of heat or pressure or both.

In the disclosed apparatus, pressure for uniting the plies of the marginal portions 48 is applied by passing the said marginal portions betweens pairs of cooperating rolls 50 and 51 (see Figure 32), one roll of each pair being suitably heated.

In the disclosed apparatus there are a series of mandrels 41 carried in relatively spaced relation by means of a pair of chains which travel around pairs of vertically spaced sprockets. The lining forming operations already mentioned are performed during the upward movement of the mandrel at one side of the apparatus.

After the marginal portions 48 of the liner receptacle are united, the mandrel carrying such liner travels around the uppermost sprocket, thereby inverting the liner as an incident to the change from an upwardly directed to a downwardly directed course of travel. Just before the mandrel with a liner formed thereon reaches a vertical position at the upper or beginning end of the downward course of travel, the laterally extending marginal portions 48 are caused to engage relatively stationary folding members such as indicated at 52 (see Figure 33) to be thereby folded into flatwise position against the respective sides of the mandrel and on the outside of the liner receptacle carried thereby. The liner receptacle is then in the condition illustrated at 53 in Figure 28 with its ears 49 extending downwardly.

During the first portion of the downward movement of the liner receptacle, the then bottom wall of the liner is brought into engagement with pairs of rollers 54 and 55 at each side edge of the mandrel. The rollers of each pair are carried by the arms such as indicated at 56 and 57, respectively, which are suitably pivoted outwardly of the path of travel of the mandrel and the liner. Spring means (not shown in Figures 33 and 34) serves to normally hold the arms and rollers 54 and 55 in the position shown in Figure 34 but permits the rollers to be displaced incident to the downward force applied thereto by the downwardly moving mandrel and receptacle. The rollers 54 and 55 are displaced by downward and outward swinging movement about the pivot mountings of the arms 56 and 57, the rollers remaining at all times in contact with the liner covered surfaces of the mandrel. It will be apparent from the foregoing explanation and by examination of Figures 33 and 34 that the rollers 54 and 55 will be operative, as an incident to the downward travel of the mandrel and liner, to fold the ears 49 outwardly and upwardly to a position against the respective end walls of the liner receptacle. Thus the liner receptacle is brought into the condition illustrated at 58 in Figure 28.

Box or carton blanks such as illustrated at 59 in Figure 28 are fed to a position in the downward path of movement of the liner receptacle covered mandrel, means, including folding members 60 and 61, are provided for cooperating with the opposite faces of the liner receptacle covered mandrel to effect folding of opposite side wall portions of the carton blank 59 upwardly as indicated in Figure 35, this folding movement being effected as an incident to the downward movement of the mandrel between the folding members 60 and 61.

End wall flaps such as indicated at 62 and 63 which project from the side wall forming portions of the carton blank are folded inwardly across the side edges of the liner covered mandrel by means of tucking members such as indicated at 64 and 65, the same being automatically moved inwardly at the proper time. Upon further downward movement of the mandrel together with the partially formed-up box blank, carton end wall flaps such as indicated at 66 (see Figures 28 and 37) are folded upwardly into overlying relation to the tongues or flaps 62 and 63. Such folding of the outer end wall flap 66 is effected by means of relatively stationary folding and pressing members such as indicated at 67 and 68 (Figure 37) which are normally yieldingly urged toward the side edges of the mandrel so as to apply sufficient pressure to insure adequate contacting of the end wall flap 66 with the underlying tongues 62 and 63.

Adhesive coated areas indicated at 69, provided on the end wall flap 66, serve to permanently unite the end wall flaps 66 to the tongues 62 and 63. Additional means for effecting a supplementary pressing operation to insure the production of an intimate and secure union between the flaps 66, 62 and 63, are also provided as will be hereinafter explained in detail and suitable means is also provided for effecting displacement from the mandrel of the lined box thus formed thereon.

*Explanation in detail*

The apparatus is supported by a main frame structure which may be of angle iron or other suitable construction, the main frame being designated 75. The working parts of the apparatus are driven from a main shaft 76 suitably journalled in the main frame and which shaft may be driven from any suitable source of power. In this instance the shaft 76 is driven by means of an electric motor 77 through gears 78, 79 and 80, the gear 78 being mounted on the shaft of the motor and the gear 80 being mounted on and connected to the main shaft 76 through the agency of suitable clutch mechanism indicated in its entirety at 81. The clutch is adapted to be manually controlled by means of a suitably located hand lever 82 so that the operation of the machine may be started and stopped at will.

The main shaft 76 has mounted on it a pair of relatively spaced sprockets 83 and 84. A shaft 85 is also suitably journalled in frame brackets or extensions 86 substantially in vertical alignment with the main shaft 76. The shaft 85 has mounted on it a pair of relatively spaced sprockets 87 and 88, respectively. A pair of chains 89 and 90 respectively engage the sprockets 83 and 87 at one side of the apparatus and the sprockets 84 and 88 at the other side, and said chains carry the mandrels 41. The mandrels 41 are mounted on the chains by means of cross-bars 91 which are rigidly secured to the respective mandrels (see Figure 5). The cross-bars 91 are in turn secured to the chains 89 and 90 in any suitable manner such as illustrated in Figure 26.

For guiding the travel of the mandrels and more particularly for preventing lateral swaying thereof intermediate the upper and lower sprockets around which the mandrel carrying chains travel, the said cross-bars 91 are extended beyond the respective chains 89 and 90 and have end portions 92 slidably engaged in suitable grooves or ways 93 provided in vertically disposed guide bars or posts 94. The posts 94 are rigidly supported by attachment to portions of the frame work. For example, as shown in Figure 8, the posts may be supported by means of adjustable screw post connections 95 to a cross-bar 96 which is rigidly secured at its ends to bracket members 97 which extend from the upward extensions 86 of the main frame.

Liner blanks such as L are fed into the upward path of travel of the mandrels 41 by suitable continuously travelling conveyor chains respectively designated 98 and 99, each of which is supported by sprockets such as indicated at 100, 101 and 102, which are suitably mounted for rotation on a table frame extension 103 of the main frame 75. The conveyor chains 98 and 99 are each provided with a series of suitably spaced lugs or abutment members 104 which are adapted to engage the rear edge of lining blanks which are manually or otherwise placed on the table top 103 for delivery by the chains into the upward path of travel of the mandrels 41.

The table frame 103 supports a table top 105 on which the liner blanks L are placed. Side guides 106 are mounted on the table top 105 in such position thereon as to receive between them the lining blank L and to properly center the blank with respect to the path of travel of the mandrels 41. The table top 105 may be supplemented and extended by means of wood or other table members indicated at 107.

The table top 105 terminates at its inner end (see Figure 4) in slightly outwardly spaced relation to the path of travel of the mandrels 41 and an auxiliary table element 108 is provided adjacent and beyond the inner side of the upward path of travel of the mandrels for supporting portions of each liner blank on that side of the path of travel of the mandrels. A suitable stop bar 109 is provided on the table part 108 for engaging the forward edge of each lining sheet as it is delivered to thereby insure proper positioning of the liner sheet.

As shown in Figure 4, the liner side guides 106 extend across the space intervening between the inner end of the table 105 and outer end of the table 108, it being understood that the side guides 106 are spaced sidewise from the path of travel of the corresponding side edges of the mandrels. Narrow ledge-like portions of the table 105 may also extend across said space on opposite sides of the mandrel so as to support the lining sheet in its travel across the path of travel of the mandrels.

The liner feeding conveyor chains 98 and 99 are, in this instance, driven continuously by means of a chain 110 (see Figure 2) which engages a sprocket 111 carried by the main shaft 76, and a sprocket 112 carried by a shaft 113 which supports the conveyor chain sprockets 101.

The lining sheet L is delivered into the path of travel of the mandrels and beneath the rolls 42 and 43 which cooperate with the mandrel as shown in Figure 29 to perform the first step in forming the liner blank into a receptacle. The rolls 42 and 43 are journalled for rotation (see Figure 19) in bearing blocks such as indicated at 114 which are slidably supported in U-shaped brackets 115, the brackets being fixedly mounted on the inner end extensions of the guide members 106. Suitable springs indicated at 116 are provided for normally urging the rolls 42 and 43 to move toward the respectively adjacent faces of the mandrels, the said spring devices including means whereby the extent of such inward movement may be limited.

The mandrels 41 travel upwardly between outer and inner plates 117 and 118, respectively, which are yieldingly urged into close contact with the respectively adjacent faces of the mandrels or with the liner blank material folded around the mandrels to thereby press the liner blanks into intimate contact with the mandrels. To improve the action of the presser plates 117 and 118, they are preferably provided with liners 119 of leather or other suitable compressible material. The provision of such lining material also serves the important advantage of protecting the liner sheets from damage by burrs and the like which might otherwise be produced in the metal plates 117 and 118 incident to the possible engagement of the mandrel therewith.

The leather-lined presser plates 117 and 118 are supported and yieldably urged toward the mandrels by means of posts 120 which are secured to the respective plates. The posts are slidably supported in the cross-bar 96 and in other similar cross-bars respectively designated 121, 122 and 123. The said cross-bars are secured at their outer ends to conveniently located frame or bracket parts substantially as indicated in Figures 4 and 8.

Springs 124 disposed around the parts 120 and between the plates 117 and 118 and the respective cross-bars serve to yieldingly urge the plates toward the mandrels. Hence in the absence of leather lining there would be a tendency for the mandrels to scuff up the plates with consequent danger to the lining blanks.

After short upward movement of a mandrel with a blank folded to U-shape around the leading end of the mandrel, inner and outer tucking members 125 and 126, respectively disposed adjacent the opposite side edges of the path of the mandrels, operate to fold end portions of the U-shaped liner inwardly across the opposite side edges of the mandrel to form the liner into a receptacle about the forward end of the mandrel.

The tucking members are best shown in Figures 3, 4 and 9. They are carried on the inner ends of pairs of rods 127 which are slidably supported in suitable brackets 128. The brackets 128 are held in fixed position by being bolted or otherwise secured to the lower cross-bars 121 and 123 and to intermediate cross-bars 129 and 130. The cross-bars 129 and 130 are in turn bolted at their ends to suitably located portions of the frame or brackets carried thereby.

The outer ends of the pairs of rods 127 are interconnected by means of outwardly facing U-shaped cross-heads 131, the outer free ends of which are closed by means of plates 132, thereby forming vertically elongated openings in the outer end connectors of said pairs of rods. Coil springs 133 connected between the plates 132 and the brackets 128 serve to resiliently or yieldingly urge the tucking members 125 and 126 to move inwardly to effect folding of the end portions of the liner as already indicated.

For withdrawing the tucking members 125 and 126 against the tension of the springs 133, there are provided cam actuated arms 134 mounted on inner and outer shafts 135 and 136, respectively. The shafts 135 and 136 are journalled adjacent their ends in suitable brackets 137 and 138 which are mounted on the cross-bars 96 and 129, and 122 and 130. The arms 134 have rollers 139 at their outer ends fitting in the elongated slots formed in the cross arms 131 of each pair of shafts 127.

The shafts 135 and 136 are each provided with an arm 140 which, at its free end, carries a roller 141 one of which engages a cam 142 on a shaft 143 and the other of which engages a similar cam 144 on a shaft 145. It will be apparent that rotation of the cams 142 and 144 will effect rocking of the arms 140 and the shafts 135 and 136 with consequent rocking of the arms 134 to thereby retract the tucking members 125 and 126. The tension of the springs 133 serves, of course, to maintain the cam engaging rollers 141 in operative engagement with the respective cams 142 and 144.

Figure 1:
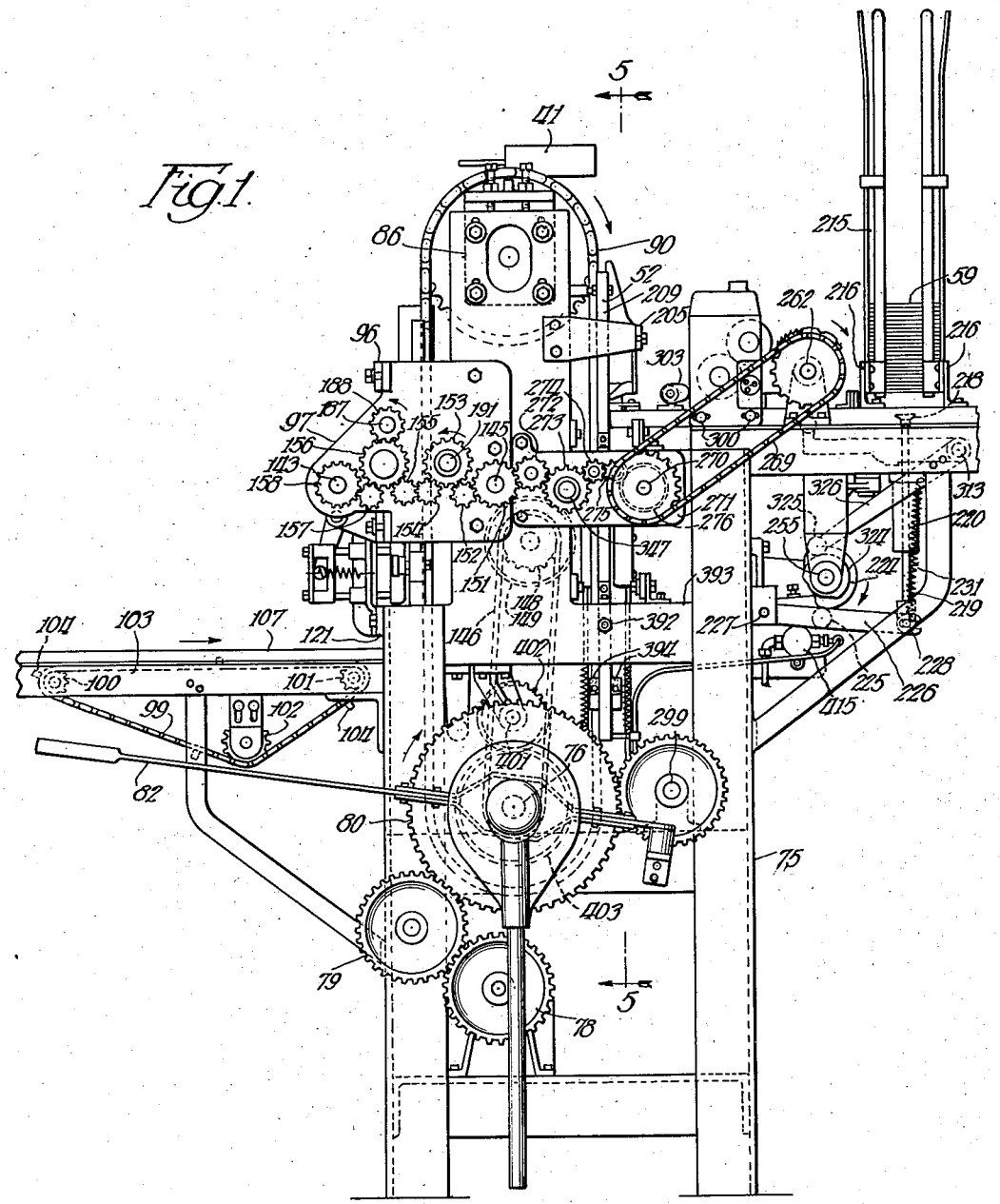
Fig. 1 is an elevation of one side of the improved apparatus.
Figure 2:
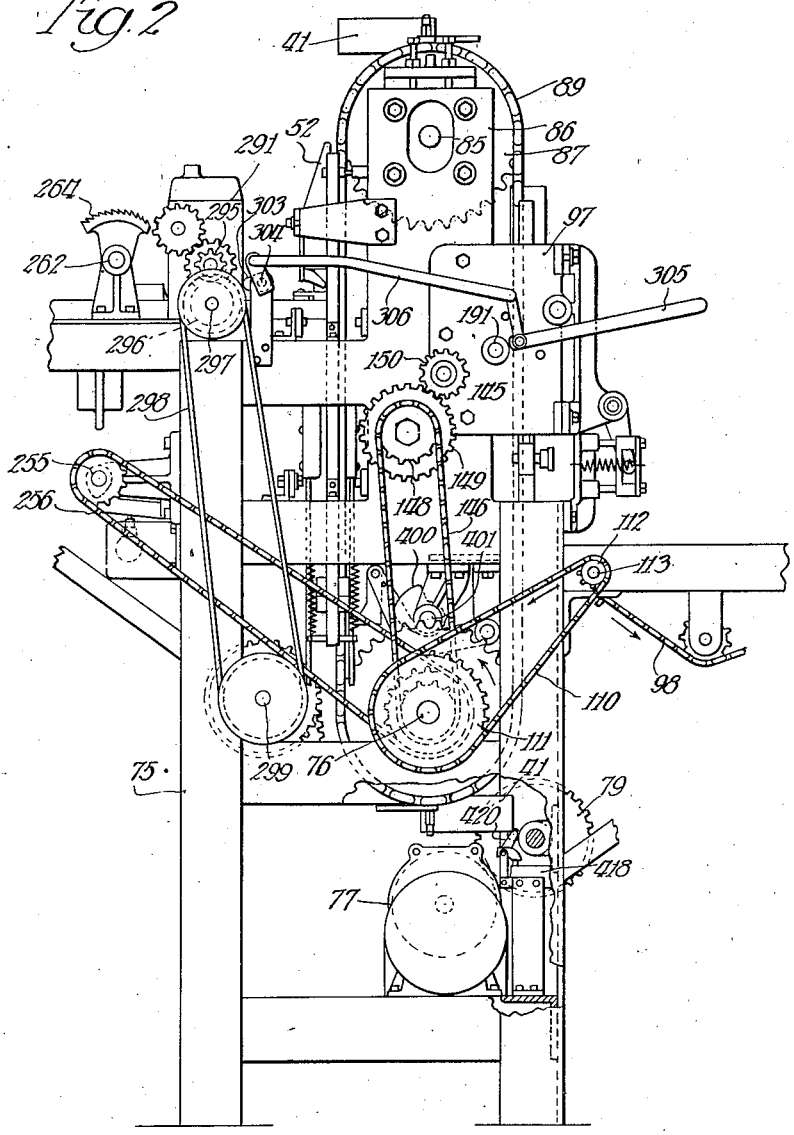
Fig. 2 is an elevation of the other side of the apparatus.

The shafts 143 and 145 are driven by means of a gear train and a chain connection to the main driving shaft 76 as best shown in Figures 1, 2 and 3. The chain driving connection comprises a chain 146 which engages a sprocket 147 mounted on the main drive shaft 76 at one side of the machine, the said chain also engaging a sprocket 148 suitably rotatably mounted on the outside of the upwardly extending frame element 86. A gear 149 is rigidly connected to the sprocket 148 so as to rotate therewith and said gear meshes with a gear 150 carried by one end of the shaft 145 on which is mounted the cam 144. The shaft 145 extends across the entire width of the machine, being suitably journalled in the opposite side frame and on its other end carries a gear 151.

The gear 151 drives a series of idler gears 152, 153, 154, 155, 156 and 157, the latter of which meshes with a gear 158 carried by one end of the shaft 143 on which the cam 142 is mounted.

The cams 143 and 44 are so formed or timed as to properly time reciprocation of the tucking members 125 and 126 for operation successively in cooperation with each of the mandrels carried by the chain 89.

For holding the end portions of the liner folded inwardly as effected by the tucking members 125 and 126 during the travel of each mandrel with a liner thereon between the tucking members and the sealing wheels or discs 50 and 51, there are provided relatively fixed guides or holder members 159 and 160 which are respectively secured to the outer and inner plates 117 and 118.

The arms 46 and 47 which cooperate with the tucking members 45 (see Figures 3, 9, 25, 26, 27 and 30) are respectively carried by arms such as indicated at 161 which are pivotally mounted respectively at the opposite sides of the machine for vertical rocking movement. As best shown in Figures 25 to 27, inclusive, the arms 46 and 47 are adjustably mounted on the arms 161 so that the free end of the arms 46 and 47 may be adjusted inwardly or outwardly into the desired relationship with the adjacent side edges of the mandrels 41 (see Figure 9). Each arm 161 is secured to a hub member 162 which is pivotally mounted on a stub shaft 163 carried by a bracket or blocking member 164.

Each hub member 162 is provided with a stop pin 165 which is adapted to come into engagement with a stop shoulder or lug 166 which projects into the path of movement of the pin 165 from the block 164.

The bracket or block 164 is vertically slidably mounted in a guide member 167 which is carried by the adjacent post 94, the guide member 167 being fixedly mounted on the post. The member 164 is freely slidable relative to the guide 167 and its downward movement (effected by gravity or springs if preferred) is limited by engagement of the lower end 168 of its mounting plate 169 with the upper end 170 of a normally stationary cam block 171. A suitable cushion 172 is interposed between the interengaging ends 168 and 170 so as to avoid noise and possible damage to the parts. The mounting plate 169 has the block 164 rigidly secured to it and said plate is in turn slidably mounted in the guide 164.

Each of the mandrel carrying cross-members 91 is provided adjacent each end with a relatively fixed, outwardly projecting member 173 having a roller 174 thereon adjacent its outer end. Each of the outwardly projecting members is located adjacent guide post 94 as best shown in Figures 25 and 26. In the course of upward movement of the mandrel carrying cross-arms 91, the roller 174 at each end of each arm is adapted to engage an end portion 175 of a small rock arm 176. Each rock arm 176 is pivotally mounted as indicated at 177 on a member 178 which is vertically slidably mounted on the front or outer face of the post 94. The other end of the arm 176 is provided with a roller 179 which is adapted to engage and ride along a vertically extending cam shoulder 180 and a horizontally extending continuation 181 of said shoulder.

The cam shoulders 180 and 181 are formed as a part of the member 171 which is suitably vertically adjustably mounted on the post 94 as best indicated in Figures 25 and 27. Near its upper end, the vertically slidably mounted member 178 is provided with an outwardly projecting stud or roller 182 which is adapted to engage the under side of the arm 161. A spring 183 connected between a pin 184 carried by the lower end of the vertically slidable member 178 and a pin 185 carried by a stop block 186 serves to yieldingly pull the member 178 downwardly. The pin 184 may conveniently be in the form of an extension of the pivot whereby the arm 176 is pivotally secured to the member 178 and the pin 185 may conveniently be in the form of an extension of a bolt employed for rigidly mounting the stop block 186 on the post 94. The stop block 186 serves, of course, to limit downward sliding movement of the member 178. If desired, a cushion element (not shown) may also be interposed between the stop block 186 and the lower end of the vertically slidable member 178.

From inspection of Figures 25, 26 and 27 it will be apparent that as an incident to the upward travel of each mandrel, the member 174 effects upward movement of the slidable member 178 so long as the rock member 176 is held by the vertical cam shoulder 180 against rocking movement which would permit the member 176 to pass by the end 175 of the rock member. When the slide 178 is moved upwardly sufficiently, the roller 179 of the rock arm is permitted to travel across the horizontally extending cam shoulder 181 to thereby permit the end 175 of the rock arm to clear the path of the member 174.

As an incident to the upward movement of the slide 178, its roller 182 comes into engagement with the arm 161 and effects upward rocking movement thereof from its downwardly inclined position shown in dotted lines shown in Figure 25 to the substantially horizontal position shown in full lines in Figure 25. The upward rocking movement of the member 161 is limited to the horizontal position by interengagement of the stop pin 165 and stop member 166.

When the arm 161 reaches the horizontal position indicated, continued upward movement of the slide 178 is transmitted through the arm 161 and its connection to the block 164 and its mounting plate 169. The upward rocking movement of each arm 161 and its member 46 or 47 is so timed with relation to the inward movement of the tucking members 125 and 126 and the vertical travel of the mandrels 41 that the members 46 and 47 will cooperate with the tucking members and the mandrel to so guide the marginal portions 48 (see Figure 28) upwardly to insure proper vertical distension thereof to permit the tucking members to bring said marginal portions substantially into face to face relation as illustrated in Figure 28. The members 46 and 47 also thus serve to insure the vertical disposition of the portions 49, 49 of the wrapper as shown in Figure 28.

The sealing rolls 50 and 51 next act on the marginal portions 48 of the liner receptacle as shown in Figure 32. Of the sealing rolls, the rolls marked 50 are fixedly mounted on a shaft 187, 187 which is journalled at its opposite ends in the frame brackets 97. At one end, the shaft 187 is provided with a gear 188 which meshes with the driven idler gear 156, whereby rotation of the shaft 187 and the sealing wheels 50 is effected.

The sealing rolls 51 are rotated independently of each other and they are mounted so as to be movable independently of each other relative to the respective rolls 50 with which they cooperate. The means for independently driving the rolls 51 and for effecting movement thereof toward and from their respective cooperating rolls 50 is best shown in Figures 4, 8, 21 and 22. As shown in the said figures, each roll 51 is mounted on one end of a short shaft 189 which is journalled in one arm 190 of a bell crank which is rockably mounted on a shaft 191. The shaft 191 is journalled in suitable bearings in the side frame brackets 97, 97 and at one end it has the gear 153 secured thereto so that the shaft is thereby rotated. The gears such as indicated at 192 are provided on the shaft 191 and in mesh with gears such as indicated at 193 which are respectively secured to the shafts 189 of the respective sealing wheels 51. Inasmuch as the sealing wheels 51, their respective shafts 189 and gears 193 are movable about the axis of the shaft 191 which carries the gear 192, it will be apparent that rocking movement of the respective wheels 51 toward and from their cooperating wheels 50 may be effected without impairing the driving connection whereby the respective wheels 51 are rotated.

The sealing wheels 51 are yieldingly urged toward the respective wheels 50 with which they cooperate by spring means such as best shown in Figures 4 and 8. The spring means comprises rods such as indicated at 194 which are pivoted to the upper ends of the bell crank arms 190 and slidably mounted adjacent their free ends in suitable brackets or hangers 195. The hangers 195 are supported in fixed position by being keyed or otherwise secured to a supporting rod 196 which is suitably mounted at its opposite ends in the frame parts 86.

A spring 197 disposed around the rod 194, and between the hanger 195 and adjustable nuts 198 on the rod 194, is normally under compression and tends to move the sealing wheel 51 outwardly or toward its cooperating wheel 50. A pair of nuts 199 on the free end of the rod 194 serves to limit the movement of the wheel 51 toward the wheel 50.

Movement of the wheel 51 away from the wheel 50 is effected by cam means such as illustrated in Figures 21 and 22. The cam means comprises for each wheel 51 a cam 200 mounted on the driven shaft 145 and arranged to engage a cam following roller 201 carried by the free end of an arm 202 which is integrally connected to the arm 190. The arms 190 and 202 constitute the bell crank previously mentioned as being rockably mounted on the shaft 191.

The cams 200 which effect movement of the sealing wheels 51 away from the wheels 50 are so timed that the wheels will be separated to permit passage of the mandrel carrying cross-bars 91 without contacting the wheels. In this way, the peripheries of the wheels are protected from nicking and other possible damage which might impair the sealing function thereof. The excessive length of the mandrels 41 as compared with the depth of the receptacles formed thereon permits disposition of the cross-bars 91 at a sufficient distance from the receptacles to permit opening and closing of the sealing wheels without engagement with the cross-bars 91 and without missing any of the marginal portions 48. It will be understood that the cams 200 are also so formed that the wheels 50 and 51 will be in cooperative relation throughout the travel of the marginal portions 48 of the liner receptacle through the zone of operation of the said wheels.

To facilitate the joining of the marginal portions by the application of pressure thereon between the sealing wheels 50 and 51, heat may be applied to soften the adhesive material which in this instance may be considered as comprising a thermo-plastic coating on the liner sheets. One convenient way for applying heat is to heat the sealing wheel 50 by means of electric heating elements indicated at 203 (see Figures 3, 4 and 8) supported by suitable connections to the cross-bar 96. The heaters 203 are supported in contact with adjacent faces of the sealing wheels 50 and transmit heat thereto.

The heat thus transmitted to the wheels 50 is sufficient to soften the thermo-plastic coating to such an extent that the two coatings disposed in face to face relation between the margins 48 become fused together under the pressure applied thereto between the wheels 50 and 51. It will be understood that in some instances pressure alone may be relied upon to effect the sealing, although for most purposes and for most of the practically available adhesives, the employment of pressure under heat seems preferable.

After the liner receptacles have passed the sealing wheels 50 and 51 they are complete so far as operations on the receiving side of the apparatus are concerned. They continue their upward travel and then are carried around the axis of the shaft 85 to begin their downward travel. During the downward travel of the mandrels with the liner receptacles formed thereon, the laterally extending marginal portions 48 are folded to flatwise position against the ends of the mandrels and suitable paper board protective boxes or cartons are formed around the liner.

The first operation in the downward travel of the mandrels is that effected by the stationary folding members 52 which serve to fold the projecting marginal portions into flatwise position on the ends of the liner receptacles and mandrels as already explained in connection with Figure 33. Incident to further slightly downward movement, the then downwardly extending triangular ear-like portions 49 are folded outwardly and upwardly against the ends of the liner receptacle and mandrels by the folding rollers 54 and 55.

The marginal folding members 52, 52 are supported by being secured to a cross-bar 205 which is in turn supported by end brackets 206 suitably secured to the frame parts 86. Said folding members 52 are formed integrally with receptacle fold retaining members which depend from said supporting cross-bar 205 as best shown in Figures 5 and 18. As there shown, the members 52 continue downwardly as indicated at 52a and 52b, the latter parts being vertically spaced to permit the rollers 55 to move to and from a position in the path of movement of the mandrels for operation in the manner already explained. The vertically spaced parts 52a and 52b (see Figure 18) are rigidly connected through the agency of a web or plate 52c which is parallel with and which is secured to the supporting cross-bar 205.

For cooperating with the portions 52a to retain the end portions of the liner receptacle folded on the mandrel, and more particularly to cooperate with said portion 52a to prevent displacement of the end portions of the liner receptacle incident to the outward ear folding movement of the rollers 55, there are provided holding plates 207 disposed in co-planar relation with the holding plates 52a and supported by attachment to a cross-bar 208 which is secured at its ends to the frame parts 96 (see Figure 8).

As shown in Figure 8, the ear folding rollers 54 and 55 and the holding plates 207 and 52 are spaced from each other so as to permit the downward travel of the mandrel supporting cross-bars 91. During the downward travel, the cross-bars 91 are guided by means of grooved guide bars 209, 209 which receive the extremities of the cross-bars 91 as clearly shown in Figure 8. Said guide bars 209 are suitably supported by attachment to the frame parts 86 and other conveniently accessible frame parts or brackets as shown.

The rollers 54 and 55 are yieldingly urged to move into the path of movement of the mandrels. For this purpose, there are provided rods such as indicated at 210, each pivoted at one end to one of the arms 56 and 57 and slidably mounted near its outer end in a bracket part 211 carried by the cross-bar 205. A spring 212 compressed between each bracket part 211 and a shoulder formed on the rod 210 serves to yieldingly urge the roller 55 into the path of movement of the mandrel from which it is displaceable merely by the downward force of the mandrel. As shown, the arms 56 and 57 are pivotally supported as at 213 from the cross-bar 205, the axis of the pivot support 213 being disposed outwardly of the path of travel of the mandrel, so that the latter is operative to swing the respective rollers 54 and 55 outwardly as explained.

The inward movement of the rollers 54 and 55 is desirably cushioned by suitable means such as coil springs 214 disposed around outer portions of the rods 210.

*The outer carton or box feeding and forming mechanism*

The outer cartons or boxes formed from the blanks 59 already referred to are automatically formed around the liner covered mandrel from blanks delivered into the downward path of travel of the mandrels from a stack of carton blanks. As shown in Figures 1 and 6, a stack of the blanks 59 is supported by a cage structure indicated at 215 which is supported by holder brackets 216 which are mounted on conveniently accessible table-like portions of the apparatus. The cage structure 215 may consist in a plurality of vertically disposed bars at least certain of which have their lower ends turned inwardly for a short distance as indicated at 217 (see Figure 6) to underlie narrow marginal portions of the blanks so as to support the same.

The blanks are fed one by one from the bottom of the receptacle, being initially moved downwardly therefrom by means of a vertically reciprocated, vacuum device. The vacuum device mentioned comprises a suitable vacuum cup 218 carried by the upper end of a vertically slidably mounted pipe 219 (see Figures 6 and 7). The pipe 219 is vertically slidable in a vertically elongated bearing member 220, the same being carried by a more or less U-shaped bracket 221 which is supported by attachment to a table plate 222. The table plate 222 is in turn suitably supported by being mounted on frame extensions such as indicated at 223 (see Figures 6 and 7).

The pipe 219 is reciprocated in properly timed relation by means of a rotary cam 224 which acts against a roller 225 carried by an arm 226, the latter being pivotally mounted at one end as indicated at 227 on a bracket carried by the main frame 75 and having its opposite end forked as indicated at 228 and engaging a cross-pin 229 carried by a clevis 230 which is secured to the lower end of the pipe 219. A pair of springs 231, 231, stretched between the opposite ends of the cross-pin 229 and the bracket member 221 serve to pull the pipe 219 upwardly and to thereby maintain the cam following roller 225 in operative engagement with the cam 224.

The pipe 219 communicates with an exhaust pump or the like through the agency of a pipe or tube 232 and an elongated port 233 in the pipe. The port 233 is of such length that vacuum will be maintained in the pipe 219 and in the vacuum cup 218 during most of the time that the pipe and vacuum cup are in elevated position. However, the vacuum is cut off when the pipe and vacuum cup 218 approach a predetermined lower position in which it is desired to release the then withdrawn carton blank. The vacuum is cut off as clearly shown in Figure 7 and it is relieved by a vent 234 which communicates with the interior of the pipe 219 through an opening 235 therein.

The blanks are delivered to a pair of transversely spaced, horizontally reciprocated feeding bars 236 (see Figures 6 and 14) and between side guides such as indicated at 237. As best shown in Figure 10, the side guides 237 are recessed slightly on their inner faces to provide adequate clearance for the downward movement of the blanks and the recessed inner walls of the guides 237 are connected by inclined wall portions 238 to the normal wall portions 239 of the side guides. The inclined or cam-like wall portions 238 of the side guides serve to insure centering of the carton blanks between the normal inner surfaces 239 of the guides and with reference to other operating elements of the apparatus.

The feeding bars 236 are integrally or otherwise connected at their receiving ends by means of a cross member 245 which forms a carton blank engaging and advancing shoulder 246. A plate 247 is fastened to the cross member 245 so as to provide a lip extending forwardly from the upper edge of the shoulder 246 for the purpose of preventing upward displacement of the adjacent edge of a carton blank when the same is being fed forwardly.

The feeder structure comprising the connected arms 236 is slidably mounted in slots indicated at 248 in the table 222, being supported for sliding movement in such slots by means of plates 249 secured to the bottoms of the respective arms 236 and projecting laterally outwardly into rabbeted guides 250 which are secured to the bottom of the table 222 (see Figure 13). The forward end portions of the feeder arms 236 overlie the table 222 so as to be supported thereby as is best shown in Figure 6.

Reciprocation of the feeder is effected by means of a crank arm 251 carried by a vertically disposed shaft 252 which is rotatably mounted in a suitable bearing provided in a frame cross member indicated at 253. The lower end of the shaft 252 carries a bevelled gear 242 which meshes with a similar gear 254 on a shaft 255, the latter being continuously driven by a chain 256 which engages a suitable sprocket on the driven shaft 76 and a suitable sprocket on the shaft 255. The crank arm 251 is connected by a link 257 to a yoke-like member 258 (see Figures 6 and 13) which is rigidly attached to the feeder arms 236.

After a carton blank 59 has been deposited on the receiving ends of the feeder arms 236 as indicated in Figure 6, the feeder arms 236 are advanced so that the shoulder 246 engages the rear edge of the carton blank to effect forward movement thereof with the arms 236. The blank advances under a hold-down guide member 259 which is supported at one end by a cross member 260 and at its other end by a cross member 244, the blank being thereby prevented from buckling or rising from the feeder bars.

An adhesive applying wheel or segment 261, provided for applying adhesive to the carton blank areas indicated at 69 on the end flap 66 (see Figure 28), is mounted on a rotary shaft 262 in such position as to be capable of applying the adhesive to the carton blank portions mentioned during the advancement of the carton blank between the guides 237. The segment 261 is rotated continuously with the shaft 262 so that the carton blank should be caused to continue its forward movement during the operative relationship of the segment and the carton blank. In the arrangement of feeding mechanism illustrated, the blank is fed in a step by step manner by the reciprocating feeding arms 236 but provision is made in association with the segments 261 for continuing the forward movement of the blank in synchronism with the travel of the segment even during the time that the feeding arms 236 change their direction of travel and move rearwardly preparatory to the next feeding step.

The means last referred to comprises a segment 263 carried by the shaft 262 intermediate the adhesive applying segments 261 and provided with teeth 264 for engaging the carton blank to continue its forward movement in synchronized relation to the rotary movement of the printing segments.

The carton feeding segment 263 cooperates with rollers 265 which are carried by the outer end portion of an arm 266 which is pivotally mounted at its other end as shown at 267 (see Figures 11 and 12) on a bracket member 268 secured to the underside of the table 222.

The shaft 262 is journalled in suitable bearings as best shown in Figure 7 supported by the table 222 and other frame parts, and it is continuously driven by means of a chain 269 which engages suitable sprockets on the shaft 262 and on a shaft 270 which is suitably journalled in extensions 271 of the side members 86 (see Figure 1). The shaft 270 is driven continuously by a suitable train of gears including gears indicated at 272, 273, 274, 275 and 276. The gear 272 meshes with the gear 151, which is carried by the shaft 145, the drive for which has already been explained.

The various gear ratios and ratios of the chain connected sprockets are, of course, such that the shaft 262 will be driven at the proper speed for synchronized movement of the printing segment 261 and a blank 263 with reference to the other operating parts of the machine. It will be apparent that the constant speed feed of the carton blank effected by the feeding segment 263 avoids what would otherwise be a varying rate of feed due to the crank arm effected reciprocation of the feeding arms 236.

During the advancement of the blank between the feeding segment 263 and the cooperating pressure wheels 265, the blank is of course travelling beneath the hold-down guide strips 259. Spring fingers indicated at 278 are supported by the guide strips 259 and extend downwardly through suitable apertures in the guide strips so as to be capable of yieldingly pressing the carton blank downwardly from the initial supporting surfaces 279 of the feeding arms 236 to the secondary supporting surfaces 280 of the said feeding arms. The springs 278 thus insure positioning of the initially advanced carton blanks in front of secondary feed shoulders 281 intermediate the initial and secondary supporting surfaces 279 and 280. Hence when the feeding arms 236 advance the next time, the blank 259 will be engaged by said secondary shoulder 281 for effecting the second step of advancement of the carton blank. It will be observed that rearward movement of the carton blank incident to rearward movement of the feeding arms 236 is effectively prevented by the feeding effect of the feed segment 263 on the carton blank.

On the second feed movement of the feeding arms 236 (with reference to a given carton blank) the blank will be fed forwardly from the position indicated at 59b in Figure 6 to a third position such as indicated at 59c in Figure 11. Suitable spring fingers indicated at 282 supported on the guides 259 serve in the same manner that the spring fingers 278 serve to press the carton blank downwardly into position for subsequent engagement by a third feeding shoulder 283 on each of the feed arms 236. Additional spring fingers such as indicated at 284 and 285 may be provided for holding the carton blanks down on the supporting surfaces 280 of the feeding arms, the last mentioned spring members being preferably so arranged that their free ends are adapted to bite into the carton blank to prevent rearward movement thereof while at the same time affording no material resistance to the desired forward feeding of the carton blanks.

By reference to Figure 11 it will be seen that the free ends of the springs 284 and 285 are so disposed with reference to the carton blank 59c that the latter will be held against rearward movement with the feeding arms when the latter are retracted. Also, said springs 282, 284 and 285 will serve to press the carton blank 59c downwardly in front of the feeding shoulders 283 when the feed arms are fully retracted.

A further spring finger 286 is provided for engaging the rearward portion of the carton blank in its final position of advancement as indicated at 59d (Figure 11) so as to prevent rearward movement of said carton blank with retraction of the feeding arms and to cause the rearward edge portion of the carton blank to be depressed so as to be engageable with a stop 287 which serves to position the carton in properly advanced position for subsequent forming around the liner-covered mandrel. A suitable stop 243 mounted on the carton forming member 60 serves to limit forward movement of the carton blank as clearly shown in Figure 11. When the feeder arms 236 are again retracted, the carton blank 59d comes to rest on the upper surfaces of forming members 60 and 61 (see Figures 6 and 10).

The adhesive applying segments 261 are provided with suitable adhesive carrying pads or elements on their peripheries and adhesive is applied thereto by engagement with a glue carrying roller 290 which is suitably rotatably mounted in a glue pot 291. Another roller 292 is rotatably mounted in the glue pot in such position as to rotate in a bath of the desired adhesive material which may be kept at the desired temperature by electrical or other heating elements 293 incorporated in the lower portion of the glue pot as indicated in Figure 6.

The roller 292 is continuously rotated so as to constantly carry fresh adhesive to the roller 290. For so rotating the roller 292, it is mounted on a shaft 294 which is journalled in the walls of the glue pot and provided at one end outwardly of the glue pot with a gear 295 which meshes with another gear 296 carried by a shaft 297. (See Figures 4 and 7.) The shaft 297 is suitably rotatably supported and it is driven by means of a belt 298 which engages suitable pulleys carried by the shaft 297 and a shaft 299, the latter being gear-driven as clearly shown in Figure 1.

The glue pot 291 is horizontally slidably mounted on the guide rails 237, being anchored thereto by bolts 300 which pass through slots in flange-like portions of the glue pot and threadedly engage properly tapped apertures in the respective guide rails 237. (See Figures 1 and 7.) Springs such as indicated at 301, positioned in a suitable housing 302, serve to normally urge the glue pot to move away from a normal operative relationship to the adhesive applying segments. For effecting adjustment of the glue pot from inoperative position as shown in full lines in Figure 6 to operative position indicated in dotted lines in Figure 6, there is provided cam means such as indicated at 303 carried by a rotatably mounted shaft 304. The shaft 304 is subject to manual adjustment through the agency of a hand lever 305 (see Figure 2) which is pivotally mounted on the side bracket 97 and connected by means of a link 306 to an arm carried by the shaft 304.

By suitable manipulation of the hand lever 305 the cam 303 may be adjusted from the inoperative position shown in full lines in Figure 6 to the operative position shown in dotted lines to effect movement of the glue pot to operative position as before explained.

The rollers 265 which cooperate with the teeth 274 on the carton blank feeding segment 263 are yieldably urged upwardly by springs 307 supported by bolts depending from the table 222 and connected at their lower ends by a cross plate 308. The springs 307 are interposed between the cross plate 308 and the bottom of the roller supporting member 266 and upward movement of the latter under the influence of the springs 307 may be limited by suitable set screws 309 which are threaded through the member 266 and adapted to engage the bottom of the table 222 (see Figures 11 and 12).

For cooperating with the adhesive carrying or transfer pads of the segments 261 there are provided carton blank supporting rollers 310, each rotatably supported by an upwardly extending free end portion 311 of arms 312. The arms 312 are each pivotally mounted on a shaft 313 which is in turn suitably journalled in suitable brackets 314 secured to the bottom of the table 222. A U-shaped member 315 disposed intermediate the arms 312 has its free arm ends pivotally mounted on the shaft 313.

The U-shaped member 315 is provided, at the connected ends of its arms, with laterally outwardly extending ears 316 which underlie similar ears 317 which extend from the respectively adjacent arms 312. The mutually overlapping ears 316 and 317 are interconnected by means of bolts 318 which are anchored in fixed relation to the ears 317 and are slidable through the ears 316. Suitable stop nuts 319 on the lower ends of the bolts 318 serve to limit downward movement of the member 315 relative to the arms 312 as well be apparent from examination of Figures 11 and 14, and springs 320 disposed around the bolts 318 serve to yieldingly support the respective arms 312 and to yieldingly urge the rollers 310 upwardly for pressing carton blank portions against the segments 261.

The U-shaped member 315 is supported in fixed position by means of an arm 321 mounted on the shaft 313 and pinned thereto as shown in Figure 12 so as to be non-rotatable on the shaft, the free end of the arm 321 being adjustably clamped to one of the side arms of the U-shaped member 315. For that purpose a shouldered bolt 322 passes through a slot 323 in the arm 321 and is threaded into the side arm of the U-shaped member 315. It will be seen that by adjusting the relationship of the arm 321 relative to the arm of the U-shaped member 315 some adjustment is permitted of the vertical position of the U-shaped member 315 and thus of the arms 312 and the rollers 310.

The position of the shaft 313 is controlled by a cam 324 carried by the shaft 255 (see Figure 1). The cam 324 acts against a roller 325 carried by the free end of an arm 326, the other end of which is rigidly connected to the shaft 313. The cam 324 is so shaped that the shaft 313 will be periodically permitted to turn in a counter-clockwise direction as viewed in Figures 1, 6 and 11.

In the event that there is no carton blank in position for receiving an application of adhesive on its end flap, the cam 324 will, in properly timed relation, permit the said counter-clockwise turning of the shaft 313 (by gravity or spring means if preferred) and thereby effect lowering of the arms 312 and the rollers 310 so as to prevent contacting of the rollers 310 with the adhesive carrying pads on the printing segments 261. In this way, the rollers 310 are kept clean. To prevent such downward movement of the rollers 310 when a carton blank is in position for receiving an application of adhesive, there is provided a latch member 327 adapted to engage a dog 328 which projects from the connecting member of the U-shaped member 315. The latch member 327 is pivoted adjacent its upper end as shown at 329 on a pin suitably supported by brackets upstanding from the table 222 and the upper end of the latch member is provided with a laterally extending plate-like portion 330 which is adapted to engage the bottom side of the carton blanks being fed by the feeding members 326. A spring 331 stretched between the latch 327 and the relatively stationary cross plate 308 serve to yieldingly rock the latch 327 away from its operative relation to the dog 328 and so as to cause the plate-like extension 330 of the latch to move upwardly into the path of travel of the carton blanks substantially as shown in Figure 6. When the latch is in the inoperative position shown in Figure 6 and the printing segments 261 are in their upwardly disposed position as shown, the arms 312, the U-shaped member 315 and the dog 328 are supported in their normal position as shown in full lines in Figure 6 by the cam 324.

When a carton blank is advanced it will of course engage and depress the upper arm portion 330 of the latch so as to swing the latch to its operative position shown in Figure 11 wherein it serves to lock the U-shaped member 315, the arms 312 and the rollers 310 in their operative position for cooperation with the printing segments. In the event that there is no carton blank in place, the latch will remain in its inoperative position as shown in Figure 6 and the cam 324 will permit the arms 312 and the rollers 310 to move downwardly so as to avoid contact between the printing segments and the said rollers.

The operation of the carton blank feeding mechanism is so synchronized with the continuous travel of the mandrels that a carton blank is deposited on top of the forming members 60 and 61 just before each mandrel with a liner thereon approaches and enters between said forming members. The advancing liner covered mandrel will engage the carton blank which is preferably prescored or creased to facilitate folding along predetermined lines, and forces the carton blank downwardly between the members 60 and 61 to thereby effect upward folding of the opposite side wall forming portions of the carton blank.

The forming members 60 and 61 are mounted for movement toward and from each other, or, in other words, toward and from the respectively adjacent sides of the mandrel. For this purpose they are seated on supporting shelves or bars 335 and 336, the same being suitably supported from conveniently accessible parts of the main frame structure as shown in Figure 5. The forming members 60 and 61 are of approximately like construction and each comprises a main body member having its upper inner corner portion bevelled as indicated at 337 to facilitate the upward folding of the carton side portions in cooperation with the downward movement of the mandrel between the forming members. The members 60 and 61 are transversely slidably mounted on the supporting shelves 335 and 336 by means such as bolts 338 which pass through suitable slots in the members 60 and 61 and are rigidly secured to the supporting shelves 335 and 336.

Spring means such as indicated at 339, acting between respective forming members 60 and 61 and bracket members carried by the respective supporting shelves 335 and 336, serve to yieldingly effect movement of the forming members inwardly of the mandrel so that the forming members are caused to firmly press the upwardly folded carton side portions against the mandrel.

For folding the corner flaps 62 and 63 of the carton blank inwardly across the ends of the liner-covered mandrel there are provided pairs of flap folders 64 and 65 for cooperation with each of the opposite edges of the mandrel. As best shown in Figures 6 and 16, said members 64 and 65 comprise suitably shaped plate-like portions carried by short rods such as 342, which are slidably mounted in the respective forming members 60 and 61. The rods 342 on opposite sides of the mandrel are interconnected at their outer ends by cross members such as 343. Spring means such as indicated at 344 interposed between the respective connecting members 343 and the forming members 60 and 61 serve to normally retract the corner flap shoulders 64 and 65 into recesses provided therefor in the said forming members as best shown in Figure 15.

In properly synchronized relation with the movement of the mandrel between the forming members 60 and 61, the corner flap folders 64 and 65 are moved inwardly to engage and fold inwardly said corner flaps 62 and 63 substantially as shown in Figures 15 and 16. The means for moving said corner flap folders inwardly is best shown in Figures 4, 6, 15 and 18. Such means comprises cams 345 and 346 carried respectively by the shafts 347 and 270. The shaft 270 is rotated continuously by the means already explained and the shaft 347 is rotated by means of the gear 273 which is mounted on an extended end portion of said shaft and included in the gear train already explained and illustrated in Figure 1.

The cams 345 and 346 each act against a roller carried by the free end of an arm 348 which is secured to a shaft 349 suitably rotatably supported as best shown in Figure 18. Arms 350 also secured to each of said shafts 349 extend upwardly therefrom and carry rollers 351 which act against said connecting members 343. It will thus be seen that the cams 345 and 346 are operative to move the corner flap folders 64 and 65 inwardly against the resistance of the springs 344 to effect the corner flap folding operation as above set forth.

To prevent unfolding or opening up of the folded ends of the liner during the travel of the liner and mandrel between the holding devices 52b and zone in which the carton corner flaps are folded inwardly so as to hold the liner in folded position, there are provided pivoted finger devices designated 352, the same being supported by suitable brackets 353 carried by a cross bar 354 (see Figures 6 and 18).

The members 352 extend across most of the distance between the fold holders 52b and the zone in which the carton corner flaps come into folded position, and they also extend across the zone in which the carton blanks are delivered by the reciprocating feed device into folding position on top of the forming members 60 and 61. Light springs 355 are suitably connected with the finger devices 352 to normally maintain the fingers in their vertically disposed position as illustrated in Figures 6 and 18 while at the same time permitting said fingers to be rocked upwardly by an incoming carton blank, to the position shown in Figure 11. It will be apparent that the fingers 352 will follow the carton blank downwardly to resume the vertical position shown in Figure 6, suitable means being provided if necessary to limit the pivoting movement of the members 352 by the spring means 355.

Continued downward movement of the mandrel causes the carton end flaps 66 to come into engagement with the upper rounded ends 67 and 68 of the end flap folding members 367 and 368, respectively, at each end of the carton blank to effect upward folding of said end flaps as an incident to the downward progress of the mandrel.

The end flap folding members 367 and 368 are supported for movement toward and from the respectively adjacent edges of the mandrel and means is provided for resiliently urging the said folding members toward the mandrel. The mounting means and the resilient pressure means are best shown in Figure 5 wherein the folding members are illustrated as being provided with rigidly attached, outwardly extending posts 369 which are slidably fitted in openings provided in a mounting plate or bracket 370.

The mounting plate or bracket 370 is in the form of an angle member, one flange of which indicated at 371 is rigidly attached to inner and outer side plates 372 and 373. Suitable stop nuts on the outer ends of the posts 369 serve to limit inward movement of the folder pressure plates 367 and they are normally urged to their innermost position by means of springs indicated at 374 suitably positioned between the pressure plates 367 and said brackets 370 to serve the said purpose. As shown, the end folder members 367 and 368 are spaced from each other so as to provide a passageway for the mandrel carrying cross arms 91.

The inner and outer pressure plates 372 and 373 depend from the bottoms of the folders 60 and 61 and they are also mounted for movement inwardly and outwardly relative to the path of travel of the mandrel.

The plates 372 and 373 may be so mounted in any suitable arrangement. One means for so mounting the plates is shown in Figures 4 and 17 wherein the upper portion of one of the plates is movably supported on a screw post 375, which is threaded into the supporting shelf 335 and locked in place by means of a set screw 376. A spring 377 is provided around the screw post 375 between the pressure plate and a recessed portion of the shelf 335 to yieldingly urge the pressure plate to move toward the mandrel. The upper end portion of each pressure plate 372 and 373 is preferably bevelled or rounded as indicated at 378 to facilitate entrance of the carton covered end of the mandrel between the said plates. At a point spaced downwardly from its upper end, each of the pressure plates 372 and 373 is also supported for in and out movement relative to the mandrel and yieldingly urged inwardly by means of posts such as shown at 379 rigidly secured to the respective pressure plates and slidably mounted in suitable openings in angle brackets 380, the latter being mounted on frame members such as shown at 381. Springs around the posts 379 serve to yieldingly urge the pressure plates inwardly.

The carton sides are supported in their upright positions relative to the bottom by the inner and outer pressure plates 372 and 373 and the end pairs of pressure plates 367 and 368 for a sufficient length of time during the travel thereof to insure setting of the adhesive, so that the carton will not open up upon being released from the confining pressure plate structure. However, it is desirable to effect a further application of pressure to the ends of the carton so as to insure intimate contact between the interengaging faces of the folded flap portions constituting the end walls of the carton. For this purpose there is provided a pair of end pressure members comprising cushion-surfaced heads 382, respectively pivotally mounted on shafts such as 383 suitably supported in bearing brackets attached to and depending from the frame members 381.

Each pressure member 382 has secured to it a roller 384 which in normal position is located within the path of travel of the carton covered mandrel so that the carton covered mandrel end will engage the rollers 384 and, as an incident to continued downward movement, effect downward rotary movement of the respective pressure heads 382. The surface cushions 385 on said pressure members then apply a rolling pressure against the ends of the carton to thereby squeeze the adhesively united end flaps tightly together. As best shown in Figure 9 the pressure heads 382 are of such width that they operate on the inner portion of the carton ends and similar pressure heads 386 are provided for acting on outer portions. In effect, the pressure heads 382 and 386 at each end of the carton constitute split pressure heads so as to permit the mandrel carrying cross bars 91 to travel therebetween.

The downward rotary movement of the pressure heads 382 and 383 is resisted in this instance by springs such as indicated at 387 stretched between lower end portions of the guides 209 and arm extensions such as 288 of the respective pressure heads. It will be observed that the springs 387 will serve to restore the pressure heads to their normal position as shown in Figure 5 from a downwardly turned position as soon as the mandrel has passed beyond the said pressure heads. A suitable stop such as 394 secured to each of the guides 209 in position for engagement with the respective arms 388 may be provided for limiting the extent of upward turning movement imparted to the pressure heads by the springs 387.

It is preferable that the pressure heads 382 and 386 be mounted for adjustment inwardly and outwardly relative to the adjacent faces of the mandrel so as to accommodate boxes of various thicknesses and end fold constructions. The heads may be adjustably mounted in the manner illustrated in Figure 20 wherein the support for one of the shafts 383 is shown as consisting of a journal block 389 slidably associated with a mounting plate 390 which is in turn either fixedly or adjustably secured to the supporting frame member 381. (See also Figure 4). The journal block 389 is provided with elongated slots 391 through which pass suitable clamping bolts threaded into the mounting plate 390 and by means of which clamping bolts the journal block 389 may be locked in any selected position. An adjustable set screw 392 may be threadedly supported in a conveniently located frame part such as the horizontal bottom leg portion 393 of the frame extension 86. The inner end of said set screw may be arranged to abut the outer end of the journal block 389 for supporting the same against outward movement under normal operating conditions thereby to relieve the clamping bolts from excessive strains in holding the journal blocks 389 in fixed position.

After the carton has passed the pressure heads, it is ready to be discharged from the mandrel for subsequent delivery to the carton filling machine or elsewhere as may suit the requirements of the user of the described apparatus.

For stripping the lined cartons from the ends of the mandrels, each mandrel is provided with an outwardly displaceable bottom or end piece 410 which is slidably supported in the mandrel by means of a T-shaped bar 411 which is in turn slidably mounted in an appropriately shaped guide-way 412 formed at one side of the mandrel. Said end piece 410 is normally held in retracted, mandrel end forming position by means of a coil spring 413 stretched between a portion of said end piece and the cross arm 91 of the mandrel.

For automatically moving the mandrel end piece 410 outwardly to thereby strip the lined carton from the mandrel, there is provided a vertically and inwardly and outwardly movable pawl 395 which is adapted to engage the upper end of the slide bar 411 and to travel downwardly faster than the mandrel so as to effect carton discharge without changing the rate of travel of the mandrels.

The pawl 395 has its upper end pivoted as shown at 396 to the free end of an arm 397 which is pivotally mounted at its other end as at 398 in a suitable bracket carried by the table plate 108 or other conveniently accessible frame part. Said arm 397 has secured to it a roller 399 which engages a rotary cam 400, the latter being carried by a shaft 401 which is rotatably supported in suitable bearing brackets best shown in Figures 4 and 20, which are also supported by said table plate 108 or other conveniently accessible frame part.

The shaft 401 is continuously rotated by means of a gear connection with the shaft 76 (see Figures 1 and 20). The said gear connection comprises a gear 402 secured to the shaft 401 and a gear 403 secured to the shaft 76.

From inspection of Figure 4, it will be apparent that the cam 400 will be operative to effect vertical rocking movement of the arm 397 and hence to effect vertical movement of the pawl 395. In and out movement of the lower or foot end of the pawl relative to the path of travel of the mandrel is effected by means of a suitable cam slot 404 provided in a bracket plate 405 which is carried by the lower end of the inner pressure plate 372. The pawl is provided with a pin 406 which rides in said cam slot 404 to thereby impart to the pawl the desired in and out or horizontal movement as determined by the shape of the cam slot.

The inner pressure plate 372 has its lower end portion slotted as shown at 407 to permit the pawl 395 to move inwardly into overlying relation to the upper end of each slide bar 411 so as to be engageable with such end thereof to effect downward movement of the slide bar and mandrel end piece incident to the downward movement of the pawl. The downward movement of the pawl 395 is effected at a considerably higher rate of travel than that of the mandrels, so that while the mandrels continue their normal travel, the pawl is capable of displacing the mandrel end piece in the manner indicated to thereby strip the lined carton from the mandrel.

For assisting or insuring dropping of the lined carton from the displaced end piece of the mandrel, a blast of air is directed downwardly against the lined carton. For that purpose a suitably disposed pipe 414 is secured to the outer pressure plate 373 and connected to a source of air through a valve 415. The valve 415 is periodically opened to permit a blast of air to blow the lined carton from the mandrel end piece, the valve being automatically controlled by a cam 416 mounted on the shaft 255 and acting against a roller carried by a lever 417 pivoted at one end to a conveniently accessible frame part or bracket. The cam 416 is, of course, so timed that air blasts will be delivered each time a lined carton passes the discharge end of the pipe 414.

As a further safeguard against the carrying of a lined carton covered mandrel upwardly through the liner forming mechanism, there is provided an electric switch 418 suitably mounted adjacent the path of travel of the mandrels 41 intermediate the lined carton discharging position and the entrance to the liner forming mechanism. Said switch 418 is adapted to be opened (or closed) to thereby stop the operation of the machine by a rock arm 419 which is controlled by another rock arm 420.

Each mandrel 41 is provided in its front or leading end with a suitable notch or opening 421 (see Figures 4 and 19) which will clear the free end of the arm 420 and permit the mandrel to pass the said arm end without moving it. However, if a carton is present on the end of the mandrel, the carton will cover the slot or opening 421 and will engage the free end of the arm 20 and actuate the same as an incident to the travel of the mandrel, thereby to actuate the switch 418 and stop the operation of the machine, thereby preventing possible damage to the liner forming mechanism which might occur in the event that a carton covered mandrel should enter the liner forming mechanism.

The lined boxes formed by the apparatus described may be delivered to a suitable conveyor for transferring to filling or other apparatus as may suit the requirements of the user of the machine, or the lined cartons may simply be delivered to a collecting receptacle disposed in proper position beneath the point of discharge of the lined cartons.

The described apparatus is continuous in its operation and is substantially automatic in its operation. In the described arrangement the only manual operation contemplated is that of feeding liner blanks one by one to the conveyor 99 and the delivery of stacks of carton lanks to the receptacle 215. These operations are of course relatively simple and can be satisfactorily handled by a single operator of the machine.

The described method of producing a lined carton by forming the carton around the liner avoids a relatively difficult operation of forming a liner into a receptacle and then inserting such liner into a preformed carton.

The described apparatus may be changed in many respects without departing from the principles of mechanism and operation herein disclosed and without departing from the spirit of the invention as defined in the following claims which should be construed as broadly as possible, consistent with the state of the art.

I claim:

1. In apparatus of the class described, the combination of a mandrel, means for continuously propelling said mandrel, means for feeding a blank sheet into the path of travel of the mandrel, means cooperating with said mandrel to fold said blank sheet around the advance end of the mandrel to thereby fold the sheet into U-shaped form embodying receptacle side walls and a bottom wall portion, reciprocable means operative during the travel of said mandrel, for folding end portions of said side walls inwardly over a face of said mandrel, means cooperating with said reciprocable means to effect folding of an end portion of said bottom wall forwardly in the direction of and during travel of the mandrel, means for uniting the inwardly folded side wall end portions to thereby form sealed receptacle end walls, means for engaging said forwardly folded bottom portions to fold the same outwardly and rearwardly of the mandrel into overlapping relation to said sealed end walls, means for delivering an outer container blank into the path of travel of the receptacle carrying mandrel, means for forming said last-mentioned blank into container form around the receptacle carried by the mandrel, and means for stripping the receptacle and outer container as a unit from the mandrel.

2. In apparatus of the class described, the combination of a mandrel, means for continuously propelling the mandrel, means for positioning a receptacle blank in the path of travel of the mandrel and in predetermined relation thereto, means cooperating with said mandrel to fold opposite marginal portions of the blank rearwardly on opposite sides of the mandrel so as to thereby form receptacle bottom and side walls around the advancing end of the mandrel, reciprocable means movable transversely of the direction of and during the travel of the mandrel and adapted to engage opposed end portions of said side walls so as to fold the same toward each other across a face of the mandrel, means for engaging said bottom wall to fold the same forwardly in the direction of travel of the mandrel during the operation of said reciprocable means, means for uniting said inwardly folded end portions to form a sealed end wall, and means for folding said forwardly folded bottom wall portion into overlapping relation to another wall portion of the receptacle.

3. In apparatus of the class described, a mandrel, means for propelling said mandrel comprising an endless chain, relatively spaced sprockets for movably supporting said chain, said mandrel being attached adjacent its rear end to said chain whereby, when said mandrel is moved by the chain around one of said sprockets, the forward portion of said mandrel is offset laterally from the path of travel of said chain, means for forming on the front end portion of the mandrel a receptacle having a side wall portion embodying a laterally extending joint flange, said receptacle forming means being operative to form said receptacle on the mandrel before the mandrel is carried by said chain around one of said sprockets, and relatively stationary means adapted to cooperate with the advancing end portion of the mandrel to effect folding of said joint flange into face to face relation with said receptacle side wall as the mandrel returns from offset to normal position upon movement around said sprocket.

4. In apparatus of the class described, a mandrel, means for propelling said mandrel comprising an endless chain, relatively spaced sprockets for movably supporting said chain, said mandrel being attached adjacent its rear end to said chain whereby, when said mandrel is moved by the chain around one of said sprockets, the forward portion of said mandrel is offset laterally from the path of travel of said chain, means for forming on the front end portion of the mandrel a receptacle having a side wall portion embodying a laterally extending joint flange, said receptacle forming means being operative to form said receptacle on the mandrel before the mandrel is carried by said chain around one of said sprockets, relatively stationary means adapted to cooperate with the advancing end portion of the mandrel to effect folding of said joint flange into face to face relation with said receptacle side wall as the mandrel returns from offset to normal position upon movement around said sprocket, means for forming an outer container around said receptacle on the advancing end portion of the mandrel, and means for stripping the receptacle and container as a unit from the mandrel.

5. In apparatus of the class described, a mandrel, means for propelling said mandrel comprising an endless chain, relatively spaced sprockets for movably supporting said chain, said mandrel being attached adjacent its rear end to said chain whereby, when said mandrel is moved by the chain around one of said sprockets, the forward portion of said mandrel is offset laterally from the path of travel of said chain, means for forming on the front end portion of the mandrel a receptacle having a side wall portion embodying a laterally extending joint flange, said receptacle forming means being operative to form said receptacle on the mandrel before the mandrel is carried by said chain around one of said sprockets, relatively stationary means adapted to cooperate with the advancing offset end portion of the mandrel as it is carried around said sprocket to effect folding of said joint flange into face to face relation with said receptacle side wall, means for positioning an outer container blank in the path of travel of the receptacle carrying mandrel, means for forming said outer container blank into a container around the receptacle carrying end of the mandrel, means intermediate said relatively stationary means and said outer container forming means for maintaining said joint flange in said folded condition, and means for stripping said receptacle and outer container as a unit from the mandrel.

6. In apparatus of the class described, a mandrel, means for propelling said mandrel comprising an endless chain, relatively spaced sprockets for movably supporting said chain, said mandrel being attached adjacent its rear end to said chain whereby, when said mandrel is moved by the chain around one of said sprockets, the forward portion of said mandrel is offset laterally from the path of travel of said chain, means for forming on the front end portion of the mandrel a receptacle having a side wall portion embodying a laterally extending joint flange, said receptacle forming means being operative to form said receptacle on the mandrel before the mandrel is carried by said chain around one of said sprockets, relatively stationary means adapted to cooperate with the advancing offset end portion of the mandrel as it is carried around said sprocket to effect folding of said joint flange into face to face relation with said receptacle side wall, means for positioning an outer container blank in the path of travel of the receptacle carrying mandrel, means for forming said outer container blank into a container around the receptacle carrying end of the mandrel, means intermediate said relatively stationary means and said outer container forming means for maintaining said joint flange in said folded condition, said means comprising a movably mounted element extending across the zone occupied by said outer container blank when disposed on said positioning means, said movable element being adapted to be engaged by the outer container blank and displaced to permit said positioning of the blank, and means for stripping said receptacle and outer container as a unit from the mandrel.

7. In apparatus of the class described, means for forming a blank into a receptacle comprising a pair of relatively spaced folding heads, a mandrel mounted for movement between said heads and operative to propel a container blank between said heads so as to cause the latter to fold opposite side portions of the blank on opposite sides of the mandrel, corner flap folders slidably mounted in said folder heads and movable inwardly of the mandrel for folding corner flap portions of the container blank inwardly across a side of the mandrel, means for actuating said corner flap folders, relatively stationary means for engaging end flap portions of the container blank to effect folding thereof over the corner flap portions, yieldable means for maintaining the blank folded around the mandrel during extended movement of the latter, and means for stripping the folded container from the mandrel.

8. In apparatus of the class described, the combination of means for folding a container blank to form a container embodying a bottom wall, side walls, corner flaps extending inwardly from the ends of said side walls and an end flap folded over and united to said corner flaps, said means comprising folding devices and a mandrel movable through said folding devices, and rockable means positively actuated by said mandrel as an incident to the travel thereof subsequent to its movement through said folding devices for applying substantial pressure to the overlapping flap portions of the container to insure intimate interengagement therebetween.

9. In apparatus of the class described, the combination of means for folding a container blank to form a container embodying a bottom wall, side walls, corner flaps extending inwardly from the ends of said side walls and an end flap folded over and united to said corner flaps, said means comprising folding devices and a mandrel movable through said folding devices, rockable means positively actuated by said mandrel as an incident to the travel thereof subsequent to its movement through said folding devices for applying substantial pressure to the overlapping flap portions of the container to insure intimate interengagement therebetween, and means independent of said mandrel for effecting return movement of said pressure applying means.

10. In apparatus of the class described, the combination of a mandrel, means for continuously advancing the mandrel, means for folding a blank around the leading end of said mandrel to form a container thereon, the front end of said mandrel over which the container is formed being outwardly displaceable, a rod connected to said front end and extending rearwardly therefrom within the area of said mandrel, a pawl mounted for movement initially inwardly of the mandrel from outside the area thereof and subsequently in parallelism with the mandrel, and means for actuating said pawl so as to cause the same to travel in parallelism with the mandrel at a faster speed than the mandrel, said pawl being thereby operative to engage the rear end of said rod to effect displacement of the front end of the mandrel to thereby strip the container from the mandrel.

11. In apparatus of the class described, the combination of a mandrel, means for continuously advancing the mandrel, means for folding a blank around the leading end of said mandrel to form a container thereon, the front end of said mandrel over which the container is formed being outwardly displaceable, a rod connected to said front end and extending rearwardly therefrom within the area of said mandrel, a pawl mounted for movement initially inwardly of the mandrel from outside the area thereof and subsequently in parallelism with the mandrel, means for actuating said pawl so as to cause the same to travel in parallelism with the mandrel at a faster speed than the mandrel, said pawl being thereby operative to engage the rear end of said rod to effect displacement of the front end of the mandrel to thereby strip the container from the mandrel, and means for effecting release of the container from the displaced front end of the mandrel.

12. In apparatus of the class described, the combination of a mandrel, a pair of endless chains, a cross arm secured to said mandrel and connected to said chains, pairs of sprockets for movably supporting said chains, means for effecting travel of said chains and the mandrel, means for folding a container blank about the leading end of said mandrel as an incident to its travel, said means comprising folders movable inwardly from opposite sides of said mandrel to fold portions of the blank inwardly across a side of the mandrel, an arm pivoted for rocking movement in the direction of travel of the mandrel, a slide mounted for movement in the direction of travel of the mandrel, means for transmitting limited movement from said cross arm to said slide, and means carried by said slide for engaging said arm to effect pivotal movement thereof in the direction of travel of said mandrel, the free end of said pivoted arm being adapted to cooperate with said folders to control the folding of said container blank.

13. In apparatus of the class described, the combination of a mandrel, a pair of endless chains, a cross arm secured to said mandrel and connected to said chains, pairs of sprockets for movably supporting said chains, means for effecting travel of said chains and the mandrel, means for folding a container blank about the leading end of said mandrel as an incident to its travel, said means comprising folders movable inwardly from opposite sides of said mandrel to fold portions of the blank inwardly across a side of the mandrel, an arm pivoted for rocking movement in the direction of travel of the mandrel, a mounting member to which said arm is pivotally secured, means for mounting said member for sliding movement in the direction of travel of the mandrel, and means associated with said mandrel and movable in unison therewith for initially effecting rocking movement of said arm in the direction of travel of the mandrel and subsequently movement of said arm and its mounting member in parallelism with the mandrel, said arm being operative to cooperate with said folders substantially as described.

14. In apparatus of the class described, the combination of a pair of endless chains, pairs of sprockets for supporting said chains for continuous travel, a series of cross members connecting said chains at predetermined spaced points for unitary movement, container forming mandrels carried by said cross members, means cooperating with said mandrels for folding a container blank around the front end and rearwardly along adjacent faces of the mandrel, reciprocable means movable transversely of the mandrel for folding other portions of the container blank inwardly across the sides of the mandrel and to cause marginal portions of the container to come into laterally extending, face to face relation, means for uniting said face to face marginal portions, said uniting means comprising a pair of cooperating pressure wheels, one of said pressure wheels being mounted for movement toward and from the other, yielding means for normally urging said movable pressure wheel toward the other, and cam means for effecting movement of said movable pressure wheel from the other wheel, said cam means being so synchronized relative to the travel of the mandrel and said cross members as to effect separation of said pressure wheels so as to permit passage of said cross members therebetween substantially without contacting said pressure wheels.

15. In apparatus of the class described, the combination of a pair of endless chains, pairs of sprockets for supporting said chains for continuous travel, a series of cross members connecting said chains at predetermined, spaced intervals for unitary movement, a series of mandrels respectively carried by said cross members, means cooperating with said mandrels during the travel thereof to form on its leading end a container body comprising a bottom wall, side and end walls and ears extending forwardly from the front end of said mandrel, means for automatically folding said ears outwardly and rearwardly over the ends of the container on the mandrel, said means comprising an arm pivotally mounted outwardly of the path of travel of the end of a container formed on said mandrel, said arm being so pivoted as to be movable toward and from the path of travel of the mandrels, means normally urging said arm to rock toward the path of travel of said mandrel, and means carried by the free end of said arm normally disposed within the path of travel of said mandrel and adapted to be engaged by the container covered end portion thereof and automatically thrust outwardly so as to be thereby caused to engage said forwardly extending ear to fold the same outwardly, and as an incident to continued movement of the mandrel, to fold the ear rearwardly over the end of the container on the mandrel.

16. The method of producing lined cartons which consists in continuously propelling a mandrel, delivering a lining sheet in the path of travel of the mandrel so as to cause the mandrel to engage the sheet intermediate opposite edges thereof, effecting folding of the sheet into U-shaped form around the mandrel as an incident to the travel thereof, the opposed pair of walls of the folded sheet constituting side walls of a carton liner and the intervening wall constituting the bottom wall of such liner, then effecting folding of end portions of the side walls of the U-shaped liner inwardly across the ends of the mandrel and marginal end portions of opposed end portions into face to face relationship extending laterally from the mandrel ends, folding end portions of the bottom wall of said liner into edgewise extending relationship to said inwardly folded side portions, sealing together said marginal end portions, folding said laterally and edgewise extending portions into face to face relation overlying said inwardly folded portions, and then, while continuing the travel of the mandrel forming a carton around the liner covered mandrel and stripping the liner and carton as a unit from the mandrel.

17. In apparatus of the class described, the combination of means for folding a container blank to form a container embodying a bottom wall, side walls, corner flaps extending inwardly from the ends of said side walls and an end flap folded over and united to said corner flaps, said means comprising folding devices and a mandrel movable through said folding devices, a rockable pressure device for applying substantial pressure to said overlapping flap portions to insure intimate interengagement therebetween, means rigidly connected to said pressure device and extending therefrom into the path of travel of said mandrel, the latter being operative, as an incident to its normal travel, to engage said means to thereby effect rocking of said pressure device into engagement with the overlapping flap portions of a container carried by said mandrel.

18. In apparatus of the class described, the combination of means for folding a container blank to form a container embodying a bottom wall, side walls, corner flaps extending inwardly from the ends of said side walls and an end flap folded over and united to said corner flaps, said means comprising folding devices and a mandrel movable through said folding devices, a rockable pressure device for applying substantial pressure to said overlapping flap portions to insure intimate interengagement therebetween, means rigidly connected to said pressure device and extending therefrom into the path of travel of said mandrel, the latter being operative, as an incident to its normal travel, to engage said means to thereby effect rocking of said pressure device into engagement with the overlapping flap portions of a container carried by said mandrel, said pressure device having a cushion surface for resiliently pressing said overlapping flap portions together.

19. In apparatus of the class described, a mandrel, means for propelling said mandrel comprising an endless chain, relatively spaced sprockets for movably supporting said chain, said mandrel being attached to said chain in such a manner that when said mandrel is moved by the chain around one of said sprockets, a portion of said mandrel moves laterally relative to the normal path of travel of said chain, means for forming on a portion of said mandrel which moves laterally as aforesaid, a receptacle having a side wall portion embodying a joint flange extending laterally from such wall portion, said receptacle forming means being operative to from said receptacle on the mandrel before the mandrel is carried around one of said sprockets, and means operative as an incident to said lateral mandrel movement to effect folding of said joint flange into face-to-face relation with said receptacle side wall.

20. In apparatus of the class described, the combination of a mandrel, means for continuously propelling the mandrel, means for positioning a receptacle blank in the path of travel of the mandrel and in predetermined relation thereto, means co-operating with said mandrel to fold opposite marginal portions of the blank rearwardly on opposite sides of the mandrel so as to thereby form receptacle bottom and side walls around the advancing end of the mandrel, said blank being of such size and so positioned that when so folded around the mandrel, an end portion of the blank longer than ½ the distance between the side walls of the folded blank, project endwise from the mandrel, a pair of simultaneously operable folders respective operative to engage the opposed projecting side wall portions so as to fold the same toward each other across the adjacent end of said mandrel, means movable in the direction of travel of said mandrel and operable simultaneously with said folders, for engaging and folding forwardly the projecting bottom wall end portion, said side wall end portion folders and said bottom wall end portion folding means co-operating to cause marginal portions of said folded side and bottom wall end portions to be brought into face-to-face, laterally extending, joint flange forming relation, and means acting on said joint flange to seal the portions thereof to each other.

21. In apparatus of the class described, the combination of a mandrel, means for continuously propelling the mandrel, means for positioning a receptacle blank in the path of travel of the mandrel and in predetermined relation thereto, means co-operating with said mandrel to fold opposite marginal portions of the blank rearwardly on opposite sides of the mandrel so as to thereby form receptacle bottom and side walls around the advancing end of the mandrel, said blank being of such size and so positioned that when so folded around the mandrel, an end portion of the blank longer than ½ the distance between the side walls of the folded blank, project endwise from the mandrel, a pair of simultaneously operable folders respectively operative to engage the opposed projecting side wall portions so as to fold the same toward each other across the adjacent end of said mandrel, means movable in the direction of travel of said mandrel and operable simultaneously with said folders, for engaging and folding forwardly the projecting bottom wall end portion, said side wall end portion folders and said bottom wall end portion folding means co-operating to cause marginal portions of said folded side and bottom wall end portions to be brought into face-to-face, laterally extending, joint flange forming relation, and a pair of co-operating pressure rolls for acting on said joint flange to seal the portions thereof together, one of said pressure rolls being yieldingly urged toward the other, there being also provided cam means for periodically moving said movable pressure roll away from the other pressure roll to facilitate entrance of said joint flange between the rolls.

22. In container forming apparatus of the class described, the combination of a movable mandrel having an outwardly displaceable head element, means for propelling said mandrel, means for folding a blank around said mandrel and over said head element to form a container thereon, means for stripping the container from the mandrel, comprising an arm pivotally mounted at one end, a pawl pivotally mounted on the free end of said arm, said pawl being normally disposed in a retracted, inoperative position, means for initially rocking said pawl on its pivot mounting on said arm to move the free end of the pawl into a projecting, operative position, and means for rocking said arm and pawl about the pivot mounting of the arm so as to cause the pawl, when in said operative position, to move at accelerated speed relative to the speed of travel of said mandrel, and means operatively connecting said pawl and said mandrel head element to effect outward displacement of the latter as an incident to said accelerated travel of said pawl.

23. In apparatus of the class described, the combination of a series of mandrels, means for propelling said mandrels, means cooperating with each of said mandrels during the travel thereof to form on its leading end a container body comprising a bottom wall, side and end walls and ears extending forwardly from the bottom of the container at the ends thereof, means for automatically folding said ears outwardly and rearwardly over the ends of the containers on the mandrels, said means comprising an arm pivotally mounted outwardly of the path of travel of said mandrel, the free end of said arm being movable toward and from the path of travel of the mandrels, means yieldingly urging said arm to rock toward the path of travel of said mandrel, and means carried by the free end of said arm normally disposed within the path of travel of said mandrel and adapted to be engaged by the container covered end portion thereof and automatically thrust outwardly so as to engage said forwardly extending ear to fold the same outwardly and rearwardly over the adjacent end of the container on the mandrel as an incident to travel of the mandrel.

24. In apparatus of the class described, the combination of a mandrel, means for continuously propelling the mandrel, means for positioning a receptacle blank in the path of travel of the mandrel and in predetermined relation thereto, means cooperating with said mandrel to fold opposite marginal portions of the blank rearwardly on opposite sides of the mandrel so as to thereby form receptacle bottom and side walls around the advancing end of the mandrel, means operative during the travel of the mandrel to engage opposed end portions of said side walls to fold the same toward each other across a face of the mandrel, means for engaging said bottom wall to fold the same in the direction of travel of the mandrel during the folding of said side wall end portions, means for uniting said inwardly folded end portions to form a sealed end wall, and means for folding said folded bottom wall portion into face-to-face relation to a wall of the receptacle.

25. In apparatus of the class described, the combination of means for folding a container blank to form a container embodying a bottom wall and at least one pair of oppositely disposed side walls comprising mutually overlapped portions adapted to be adhesively secured together to hold said blank in folded condition, said means comprising a mandrel and surrounding folding devices, means for propelling said mandrel through said folding devices, yieldable means surrounding said mandrel for holding the container in folded condition on the mandrel during travel of the mandrel subsequent to the folding of the blank thereon, and means additional to said holding means for applying substantial pressure on said overlapped portions, while the folded blank continues to travel with the mandrel, to insure intimate inter-attachment thereof.

26. In apparatus of the class described, the combination of means for folding a container blank to form a container embodying a bottom wall and two pairs of oppositely disposed side walls of which one pair comprises mutually overlapped portions, at least some of which portions are adapted to be adhesively united to hold the blank in said folded condition, said means comprising a mandrel and folding devices associated with the mandrel, means for propelling said mandrel relative to said folding devices, means cooperating with said mandrel for holding the container in folded condition on the mandrel during the travel thereof subsequent to the folding of the blank thereon, and rotary means additional to said holding means for applying substantial pressure on said overlapped portions, while the folded blank continues its travel with the mandrel, to insure intimate inter-attachment thereof.

27. In apparatus of the class described, the combination of means for folding a container blank to form a container embodying a bottom wall and two pairs of oppositely disposed side walls of which one pair comprises mutually overlapped portions, at least some of which portions are adapted to be adhesively united to hold the blank in said folded condition, said means comprising a mandrel and folding devices associated with the mandrel, means for propelling said mandrel relative to said folding devices, means cooperating with said mandrel for holding the container in folded condition on the mandrel during the travel thereof subsequent to the folding of the blank thereon, and rotary means for applying substantial pressure on said overlapped portions, while the folded blank continues its travel with the mandrel, to insure intimate inter-attachment thereof, said rotary pressure applying means being operative on said portions after the same have been temporarily held in folded condition by said holding means.

FRANK D. PALMER.